US012621604B1

(12) United States Patent
Garcia et al.

(10) Patent No.: US 12,621,604 B1
(45) Date of Patent: May 5, 2026

(54) REDUCTION OF LOUDSPEAKER DISTORTION

(71) Applicant: Amazon Technologies, Inc., Seattle, WA (US)

(72) Inventors: Guillermo Daniel Garcia, Berkeley, CA (US); Shobha Devi Kuruba Buchannagari, Fremont, CA (US); Carlo Murgia, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 498 days.

(21) Appl. No.: 18/113,958

(22) Filed: Feb. 24, 2023

Related U.S. Application Data

(60) Provisional application No. 63/336,541, filed on Apr. 29, 2022.

(51) Int. Cl.
*H04R 3/04* (2006.01)
*H04R 9/06* (2006.01)
*H04R 29/00* (2006.01)

(52) U.S. Cl.
CPC ................. *H04R 3/04* (2013.01); *H04R 9/06* (2013.01); *H04R 29/001* (2013.01)

(58) Field of Classification Search
CPC ........... H04R 3/04; H04R 9/06; H04R 29/001
See application file for complete search history.

(56) References Cited

U.S. PATENT DOCUMENTS 10,897,670 B1 * 1/2021 Yang .................... H04R 29/001

FOREIGN PATENT DOCUMENTS

EP 3316595 A1 * 5/2018 ......... G10L 21/0264

* cited by examiner

*Primary Examiner* — Carolyn R Edwards
(74) *Attorney, Agent, or Firm* — Pierce Atwood LLP

(57) ABSTRACT

A system configured to reduce loudspeaker distortion by performing nonlinear signal processing is provided. A device may include preprocessing component(s) that apply nonlinear signal correction prior to sending a playback audio signal to a driver in order to compensate for a nonlinear response of the driver. While the driver response may be nonlinear, a combination of the preprocessing and the non-linear driver response results in a combined response that is linear and/or compensates for the nonlinear driver response. For example, applying the nonlinear driver response to a processed audio signal may result in output audio generated by the driver accurately reproducing the playback audio signal input to the preprocessing components. To train the preprocessing components to apply the nonlinear signal correction, a deep neural network (DNN) is trained to model the driver response.

19 Claims, 9 Drawing Sheets

Preprocessing DNN Training 200

REDUCTION OF LOUDSPEAKER DISTORTION

CROSS-REFERENCE TO RELATED APPLICATION DATA

This application claims priority to U.S. Provisional Patent Application Ser. No. 63/336,541, entitled "Reduction of Loudspeaker Distortion," filed on Apr. 29, 2022, in the names of Guillermo Daniel Garcia, et al. The above provisional application is herein incorporated by reference in its entirety.

BACKGROUND

With the advancement of technology, the use and popularity of electronic devices has increased considerably. Electronic devices are commonly used to receive audio data and generate output audio based on the received audio data. Described herein are technological improvements to such systems.

BRIEF DESCRIPTION OF DRAWINGS

For a more complete understanding of the present disclosure, reference is now made to the following description taken in conjunction with the accompanying drawings.

DETAILED DESCRIPTION

Figure 1:
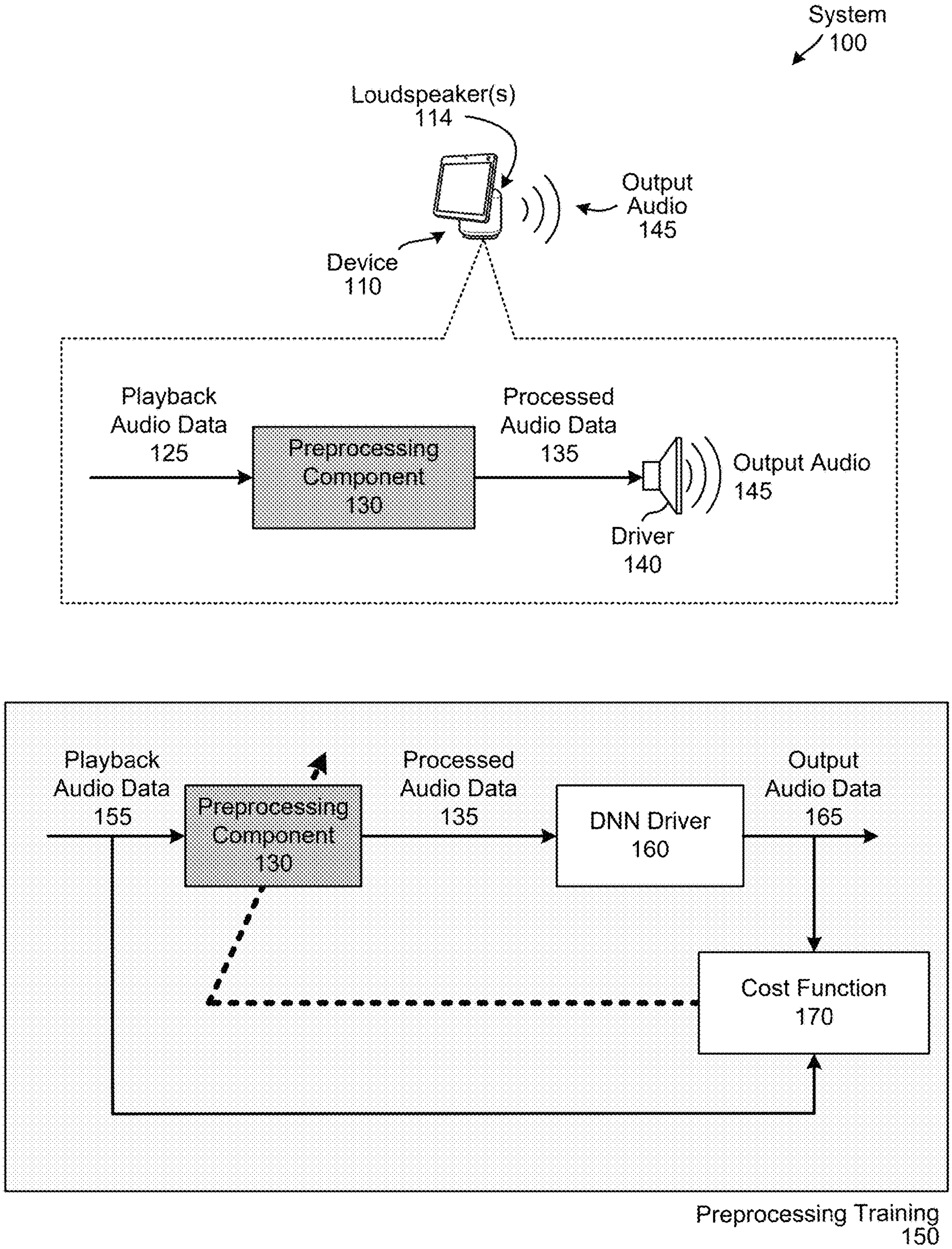
FIG. 1 illustrates a system for reducing loudspeaker distortion by applying nonlinear signal correction according to embodiments of the present disclosure.

Electronic devices such as smart loudspeakers, cellular telephones, tablets, laptop computers, and other such devices, are becoming smaller and/or more portable. As the sizes of these devices shrink, the sizes of audio-output devices—i.e., loudspeakers—associated with the devices also shrink. As the sizes of the loudspeakers shrink, however, the quality of the audio output by the loudspeakers decreases, especially low-frequency audio output (i.e., bass).

The loudspeakers may be constructed using a frame, magnet, voice coil, and diaphragm (e.g., semi-rigid membrane). Electrical current moves through the voice coil, which causes a magnetic force to be applied to the voice coil; this force causes the membrane attached to the voice coil to move in accordance with the electrical current and thereby emit audible sound waves. The movement of the diaphragm is referred to herein as excursion. The membrane may, however, have a maximum excursion that, when reached, causes the sound output to be distorted. In addition, as the current in the loudspeaker flows through the voice coil, some of its energy is converted into heat instead of sound. If the temperature is too large, this heating can damage the voice coil.

Equalization, filtering, or similar pre-processing may be used to limit the excursion and/or temperature and thereby prevent or minimize the distortion and/or damage. To protect the loudspeaker, however, across all related factors such as loudspeaker variations, operating conditions, and audio signals, the filtering is conservative such that, under typical conditions, the loudspeaker does not operate at its optimal output.

Electronic devices may be used to receive audio data and generate audio corresponding to the audio data. For example, an electronic device may receive audio data from various audio sources (e.g., content providers) and may generate the audio using loudspeakers. The audio data may have large level changes (e.g., large changes in volume) within a song, from one song to another song, between different voices during a conversation, from one content provider to another content provider, and/or the like. For example, a first portion of the audio data may correspond to music and may have a high volume level (e.g., extremely loud volume), whereas a second portion of the audio data may correspond to a talk radio station and may have a second volume level (e.g., quiet volume). These high volume levels may cause excursion beyond an upper limit (i.e., over-excursion) and/or temperature beyond an upper limit, which may cause distortion in the output audio.

To improve a user experience and reduce driver distortion, devices, systems and methods are disclosed that perform nonlinear signal processing to modify an audio signal that is sent to the driver in order to compensate for nonlinearities in the physical system. For example, a device may include one or more preprocessing components that are configured to apply nonlinear signal correction prior to sending a playback audio signal to the driver in order to compensate for a nonlinear response associated with the driver. While the driver response may be nonlinear, a combination of the preprocessing and the nonlinear driver response may result in a combined response that is linear and/or compensates for the nonlinear driver response. For example, applying the nonlinear driver response to a processed audio signal may result in output audio generated by the driver accurately reproducing the playback audio signal input to the preprocessing components.

To train the preprocessing components to apply the nonlinear signal correction, a driver deep neural network (DNN) component is trained to model the driver response. In some examples, the preprocessing components may include a preprocessing DNN component that is configured to apply nonlinear signal correction to offset nonlinear regions of the driver response. For example, the driver DNN component may be used to train the preprocessing DNN component to learn optimal weight values that pre-distort the playback audio signal to compensate for the nonlinear driver response. Additionally or alternatively, the preprocessing components may include a thermal compressor and/or an excursion limiter that are trained to apply dynamic range compression and/or amplitude limiting to reduce the distortion. For example, the driver DNN component may be used to train the thermal compressor and/or the excursion limiter to learn optimal compressor and limiter parameters that pre-distort the playback audio signal to compensate for the nonlinear driver response.

FIG. 1 illustrates a system for reducing loudspeaker distortion by applying nonlinear signal correction according to embodiments of the present disclosure. For example, a system 100 may include a device 110 (e.g., electronic device) having one or more loudspeaker(s) 114 configured to generate output audio 145. While FIG. 1 illustrates the device 110 being a speech-controlled device, the disclosure is not limited thereto and the system 100 may include any device having a loudspeaker 114. Although FIG. 1, and other figures/discussion illustrate the operation of the system in a particular order, the steps described may be performed in a different order (as well as certain steps removed or added) without departing from the intent of the disclosure. Additionally or alternatively, the components of the device 110 may be included in a different order without departing from the disclosure.

The device 110 may be configured to generate the output audio 145 based on playback audio data 125, which the device 110 may retrieve from a storage component locally and/or receive from another device. For example, the device 110 may receive playback audio data 125 corresponding to music, text-to-speech (TTS) (e.g., TTS source(s)), news (e.g., radio broadcasts, flash briefings, daily briefings, etc.), streaming radio broadcasts (e.g., streaming radio source(s), talk radio station(s), music station(s), etc.), Voice-over-Internet Protocol (VoIP) communication sessions, and/or the like without departing from the disclosure. Thus, the playback audio data 125 may include a digital or analog representation of voice, music, silence, sound effects, and/or any other audio. The playback audio data 125 may be time-domain audio data or frequency-domain audio data without departing from the disclosure. For example, time-domain audio data may represent an amplitude of audio over time, whereas frequency-domain audio data may represent an amplitude of audio over frequency.

As illustrated in FIG. 1, the device 110 may generate the output audio 145 using a loudspeaker driver (e.g., transducer) associated with one of the loudspeaker(s) 114, which is illustrated in FIG. 1 as driver 140. In some examples, an individual loudspeaker 114 may correspond to a single driver 140. For example, the device 110 may include a single loudspeaker 114 having a single driver 140, two loudspeakers **114*a*/114*b* having two drivers 140*a*/140*b*, three loudspeakers 114*a*-114*c* having three drivers 140*a*-140*c*, and/or the like. However, the disclosure is not limited thereto, and in other examples an individual loudspeaker 114 may correspond to two or more drivers 140 without departing from the disclosure. For example, the device 110 may include a single loudspeaker 114 having two drivers 140*a*/140*b*, a single loudspeaker 114 having three drivers 140*a*-140*c*, two loudspeakers 114*a*/114*b* having a combined four drivers 140*a*-140*d*, and/or the like. Additionally or alternatively, the device 110 may include a combination of single-driver loudspeaker(s) 114 and multi-driver loudspeaker(s) 114** without departing from the disclosure.

For ease of illustration, the following examples will refer to an individual driver 140 generating the output audio 145. For example, the device 110 may generate processed audio data 135 specific to the driver 140 and the driver 140 may use the processed audio data 135 to generate the output audio 145. However, it is understood that if the device 110 includes multiple drivers, the device 110 may repeat these steps for the multiple drivers without departing from the disclosure. For example, the device 110 may generate first processed audio data **135*a* specific to a first driver 140*a* and the first driver 140*a* may use the first processed audio data 135*a* to generate first output audio 145*a*, the device 110 may generate second processed audio data 135*b* specific to a second driver 140*b* and the second driver 140*b* may use the second processed audio data 135*b* to generate second output audio 145*b***, and so on.

The driver 140, which may also be referred to as a transducer, is a mechanical component of the loudspeaker 114 that is configured to take electrical energy of an audio signal (e.g., processed audio data 135) and convert the electrical energy to mechanical energy by moving air to create sound, such as the output audio 145. However, physical limitations of the driver 140 may limit loudness and fidelity of the output audio 145, especially at higher volume levels. For example, heating and excursion limitations may cause a nonlinear driver response, which may result in undesirable distortion in the output audio 145.

To illustrate an example, an ideal frequency response may include a first frequency range (e.g., 0 Hz-30 Hz) in which the frequency response increases smoothly until it reaches a desired level, a second frequency range (e.g., 30 Hz-17 kHz) in which the frequency response may remain relatively flat at the desired level, and a third frequency range (e.g., above 17 kHz) in which the frequency response may smoothly fall off from the desired level. Thus, the first frequency range may correspond to an increasing gain level and/or phase value associated with the driver response, while the third frequency range may correspond to a decreasing gain level and/or phase value associated with the driver response. In contrast, the second frequency range may correspond to a consistent gain level and/or phase value that remains close to a desired gain and/or a desired phase associated with the ideal frequency response, resulting in a relatively flat frequency response within the second frequency range. Where the frequency response is relatively flat indicates that the driver 140 is accurately reproducing all desired input signals with no emphasis or attenuation of a particular frequency band.

At higher volume levels, physical limitations of the driver 140 cause a driver response that is very different from the ideal frequency response described above. For example, at higher volume levels, heating and excursion limitations cause a nonlinear driver response, resulting in undesirable distortion. This may impact the output audio 145, especially for output frequencies in a low frequency range (e.g., between approximately 20 Hz-200 Hz) corresponding to bass reproduction. Additionally or alternatively, the higher volume levels may result in a nonlinear driver response that may introduce new and unwanted signals (e.g., spurious harmonics) that may result in harmonic distortion, intermodulation distortion, and/or the like.

To illustrate an example, at higher volume levels the driver response may flatten signal peaks, which may produce harmonic and intermodulation distortion. In some examples, the driver response may add frequency components that were not present in the input signal. For example, if the input signal is periodic, the driver response may add harmonic distortion, while if the input signal is not periodic the driver response may add non-harmonic distortion such as intermodulation distortion, although the disclosure is not limited thereto. Thus, higher volume levels may correspond to nonlinear regions of the driver response, which may add frequency components that do not exist in the input signal, although the disclosure is not limited thereto. Additionally or alternatively, higher volume levels may correspond to nonlinear regions of the driver response in which the driver response is a function of the input signal. For example, the nonlinear regions of the driver response may not correspond to a single frequency response, but instead may correspond to a plurality of frequency responses depending on the input signal.

As described above, the loudspeaker 114 includes a voice coil and a diaphragm (e.g., semi-rigid membrane) attached to the voice coil, which moves in accordance with the electrical current and thereby emits audible sound waves. For example, electrical current moving through the voice coil causes a magnetic force to be applied to the voice coil and the voice coil moves in a magnetic gap, vibrating the diaphragm and producing sound. The movement of the diaphragm may be referred to as excursion, and the purpose of the diaphragm is to accurately reproduce the voice coil signal waveform. For example, inaccurate reproduction of the voice coil signal results in acoustical distortion.

The diaphragm (e.g., membrane) may have a maximum excursion limit that, when reached, causes the output audio 145 to be distorted. For example, exceeding the excursion limit may cause inaccurate reproduction of the voice coil signal. In addition, as the current in the loudspeaker 114 flows through the voice coil, some of the energy is converted into heat instead of sound. If the temperature is too high and exceeds a temperature limit, this heating can damage the voice coil and/or cause inaccurate reproduction of the voice coil signal.

As used herein, physical limitations may refer to temperature limitations (e.g., heating limitations), excursion limitations (e.g., membrane excursion), additional nonlinearities associated with characteristics of the driver 140 (e.g., due to driver design), and/or the like. For example, the temperature limitations may correspond to the voice coil heating exceeding the temperature limit (e.g., first threshold value) and the excursion limitations may correspond to the membrane exceeding the excursion limit (e.g., second threshold value). While the temperature limitations and excursion limitations refer to measurable conditions that physically limit whether the driver 140 has a linear driver response, the nonlinearities characteristic of the driver 140 are caused by design parameters (e.g., design choices) of the driver 140 and thus refer to physical limitations inherent in the driver design that are always present. For example, the nonlinearities may be caused by a size of the driver 140, a frequency range and/or crossover frequency associated with the driver 140, and/or the like, although they may only be an issue at extreme frequencies and/or high volume levels.

As described above, the physical limitations of the driver 140 may limit loudness and fidelity of the output audio 145, especially at higher volume levels. Thus, when high temperature conditions, over-excursion, and/or high volume levels are present, the driver response associated with the driver 140 may be significantly impaired. For example, the driver response may be nonlinear, which may result in undesirable distortion in the output audio 145. This will negatively impact audio fidelity, especially bass reproduction, and speech recognition performance.

To reduce this distortion, the device 110 may include a preprocessing component 130 that is configured to apply nonlinear signal correction to compensate for the nonlinear driver response (e.g., driver response of the loudspeaker 114). Referring back to FIG. 1, the preprocessing component 130 may receive playback audio data 125 and apply nonlinear signal correction to generate processed audio data 135 with which the driver 140 may generate the output audio 145.

In some examples, the preprocessing component 130 may modify the playback audio data 125 in a way that linearizes and/or offsets nonlinear regions of the driver response. For example, the preprocessing component 130 may generate the processed audio data 135 by preprocessing the playback audio data 125 (e.g., pre-distorting the signal) to account for a nonlinear response of the driver 140. While the driver response may be nonlinear, suffer from reduced gain levels, and/or depart from the ideal frequency response in other ways, a combination of the preprocessing and the driver response may result in a combined response that is linear and/or compensates for the nonlinear driver response. For example, applying the driver response to the processed audio data 135 may result in the output of the driver 140 (e.g., output audio 145) accurately reproducing the playback audio data 125 input to the preprocessing component 130. Thus, the preprocessing performed by the preprocessing component 130 may compensate for nonlinearities in the physical system.

In order to enable the preprocessing component 130 to apply the nonlinear signal correction, the system 100 may perform preprocessing training 150 to train the preprocessing component 130. For example, the system 100 may train the preprocessing component 130 to learn optimal weights (e.g., weight values), parameters (e.g., parameter values), and/or the like that the preprocessing component 130 may use to apply the nonlinear signal correction and generate the processed audio data 135. As will be described in greater detail below, the preprocessing component 130 may apply deep neural network (DNN) modeling, dynamic range compression (e.g., temperature compression), and/or amplitude limiting techniques (e.g., excursion and/or voltage limiting), although the disclosure is not limited thereto.

In some examples, the driver 140 may be characterized by thermal model(s) and/or excursion model(s) that the device 110 may use to estimate a temperature and/or an excursion associated with the driver 140 for any input signal. The system 100 may estimate a thermal model and/or an excursion model by physically testing the driver 140 and/or performing virtual simulations without departing from the disclosure. For example, the system 100 may estimate the thermal model and/or the excursion model by performing experiments in a laboratory environment and recording actual measurement data associated with the driver 140. However, the disclosure is not limited thereto, and the system 100 may estimate the thermal model and/or the excursion model by performing simulations that estimate measurement data using a digital model of the driver 140 without departing from the disclosure.

As illustrated in FIG. 1, the system 100 performs the preprocessing training 150 to train the preprocessing component 130 using a DNN driver component 160 instead of the physical driver 140 itself. In some examples, the system 100 may generate training data in a controlled environment by playing a large variety of audio signals (e.g., input training data) through the driver 140 and recording an output of the driver 140 using a microphone to generate output training data. Thus, the training data may include both the input training data and the output training data and the system 100 may use the training data to train the DNN driver component 160 to model the driver 140. For example, knowing the output training data generated by the driver 140 in response to the input training data enables the system 100 to train the DNN driver component 160 to emulate the exact behavior of the driver 140. Thus, the system 100 may use the training data to train the DNN driver component 160 to predict output audio signals generated by the driver 140 for any input audio signal.

In some examples, the DNN driver component 160 may model the entire response of the driver 140, including both linear and nonlinear regions of operation, although the disclosure is not limited thereto. For example, the DNN driver component 160 may correspond to a nonlinear model that is configured to calculate an estimated nonlinear distortion generated by the driver 140 in response to a particular input audio signal. Thus, the DNN driver component 160 may correspond to simulation of output audio generated by the loudspeaker 114 and/or the driver 140. While the DNN driver component 160 may be adaptively updated during training, the system 100 may freeze weights (e.g., store fixed weight values) associated with the DNN driver component 160 after training is complete and the DNN driver component 160 accurately models the driver 140. Thus, when the preprocessing component 130 is being trained during preprocessing training 150, the DNN driver component 160 generates output audio data 165 using the fixed weight values. For example, the DNN driver component 160 is not adaptive and does not update weight values during the preprocessing training 150.

While the preprocessing training 150 may be performed using the physical driver 140 under certain conditions, replacing the driver 140 with the DNN driver component 160 enables the system 100 to use certain training techniques, such as backpropagation. For example, backpropagation techniques require that the system being trained is differentiable, meaning that the system can calculate derivatives of the output of the system with respect to internal parameters of the system. As the physical driver 140 is not differentiable, the system 100 is unable to train the preprocessing component 130 using backpropagation techniques and the driver 140. In contrast, modeling the driver 140 using the DNN driver component 160 enables the system 100 to use backpropagation techniques to train the preprocessing component 130 because the DNN driver component 160 is differentiable. For example, as the output of the system is differentiable with respect to parameters being adapted, the system can go down the gradient to find an optimum weight for each parameter during training. While the preprocessing component 130 and/or the DNN driver component 160 may correspond to a nonlinear model (e.g., output signal is nonlinear with respect to an input signal), the output may be differentiable with respect to the parameters themselves.

In some examples, backpropagation techniques may compute a gradient of a cost function (e.g., loss function) with respect to weights of a neural network for a single input-output example. This enables the system 100 to use gradient methods for training multilayer neural networks, such as updating weights to minimize cost. For example, the system 100 may perform backpropagation using gradient descent, stochastic gradient descent, and/or similar techniques, which may involve calculating a derivative of the cost function with respect to the weights of the neural network. Backpropagation techniques require that the output be differentiable because they iterate backward from a last layer to avoid redundant calculations. For example, backpropagation may evaluate the expression for the derivative of the cost function as a product of derivatives between each layer from right to left (e.g., "backwards"), with the gradient of the weights between each layer being a simple modification of the partial products (e.g., "backwards propagated error").

While the above description refers to the system 100 training the preprocessing component 130 using backpropagation techniques, the disclosure is not limited thereto. In some examples, the system 100 may use other optimization criteria to train the preprocessing component 130 without departing from the disclosure. For example, the system 100 may train the preprocessing component 130 (e.g., find an optimal neural network and/or optimal weight values) using other objective function definitions, searching a parameter space for optimal parameters using a genetic algorithm, particle filter, etc., and/or using other techniques without performing backpropagation or departing from the disclosure. In some examples, the system 100 may use these techniques to train the preprocessing component 130 even without the DNN driver component 160 modeling the loudspeaker frequency response, although the disclosure is not limited thereto.

As illustrated in FIG. 1, the system 100 may perform the preprocessing training 150 to train the preprocessing component 130 by connecting the preprocessing component 130 and the DNN driver component 160 in series in a cascade configuration. For example, the preprocessing component 130 may process playback audio data 155 to generate processed audio data 135 and then the DNN driver component 160 may process the processed audio data 135 to generate output audio data 165. For ease of explanation, the combination of the preprocessing component 130 and the DNN driver component 160 may be referred to as the cascade system.

In the preprocessing training 150, the cascaded system is trained to perform an identity operation (e.g., same audio signal is presented as input and output). For example, the cascaded system is trained to generate output audio data 165 that is identical to the playback audio data 155, such that a difference between the playback audio data 155 and the output audio data 165 is minimized. Thus, in order to generate output audio data 165 that is identical to the playback audio data 155, the preprocessing component 130 must compensate for (e.g., offset) any nonlinearities and/or distortion caused by the DNN driver component 160.

As the DNN driver component 160 was previously trained and is configured to use fixed weight values (e.g., weights of the DNN driver component 160 are frozen), only the preprocessing component 130 is trained during the preprocessing training 150 (e.g., only parameters associated with the preprocessing component 130 are updated). However, the DNN driver component 160 may enable backpropagation without adapting weights of the DNN driver component 160, for example using a gradient descent technique with a constrained sum. Therefore, during the preprocessing training 150 the preprocessing component 130 may learn to apply nonlinear signal correction to predistort the processed audio data 135 in such a way that linearizes and/or offsets nonlinear regions of the driver response associated with the DNN driver component 160, resulting in minimal input/output distortion. For example, the preprocessing component 130 may use the playback audio data 155 to generate the processed audio data 135 to offset the nonlinear distortion associated with the DNN driver component 160.

While the example described above refers to the preprocessing training 150 being performed with the DNN driver component 160, the disclosure is not limited thereto. Instead, the system 100 may perform preprocessing training 150 using the physical driver 140 and additional components configured to capture output audio generated by the driver 140. For example, the driver 140 may be coupled with a transducer (e.g., microphone) and an analog-to-digital converter (e.g., A/D converter) in order to generate a digital representation of the output audio generated by the driver 140. Thus, the transducer and the A/D converter coupled to the driver 140 may generate the output audio data 165 during preprocessing training 150 without departing from the disclosure.

As illustrated in FIG. 1, the system 100 may use a cost function 170 to adapt the preprocessing component 130 and determine optimal weights (e.g., weight values) and/or optimal parameters (e.g., parameter values) for the preprocessing component 130 during the preprocessing training 150. For example, the cost function 170 may measure a discrepancy (e.g., difference) between a target output and a computed output. If the cascaded system is trained to generate output audio data 165 that is identical to the playback audio data 155, the playback audio data 155 corresponds to the target output and the output audio data 165 corresponds to the computed output. For example, the system 100 may calculate error data (e.g., error signal) by subtracting the playback audio data 155 from the output audio data 165. The cost function 170 may then train the preprocessing component 130 by updating weights and/or parameters associated with the preprocessing component 130 to minimize the error data.

In some examples, the cost function 170 may use first optimization criteria to maximize the signal match (e.g., fidelity) between the playback audio data 155 and the output audio data 165, as described above. For example, a pressure level of the output audio data 165 may be represented as a sound pressure level (SPL) measured in decibels (dB), while the playback audio data 155 may be scaled to SPL dB according to a specified target loudness. In other examples, however, the cost function 170 may use second optimization criteria without departing from the disclosure. For example, the second optimization criteria may be defined as a weighted sum of two terms, one maximizing fidelity and the other maximizing loudness, although the disclosure is not limited thereto.

To illustrate an example, the system 100 may use the specified target loudness to estimate first loudness data representing first sound pressure levels (e.g., first SPL values) of the playback audio data 155. The system 100 may also determine second loudness data representing second sound pressure levels (e.g., second SPL values) of the output audio data 165. Using the first optimization criteria, the system 100 may determine a first function corresponding to minimizing a difference between the second loudness data and the first loudness data (e.g., first function maximizes fidelity) and the cost function 170 may be defined using the first function. Using the second optimization criteria, the system 100 may determine a second function corresponding to maximizing the second loudness data or the second SPL values (e.g., second function maximizes loudness) and the cost function 170 may be defined as a weighted sum of the first function and the second function. For example, the cost function may include a first association between the first function and a first value and a second association between the second function and a second value.

A signal match for the optimization criteria can be calculated in the time-domain, for example based on a mean squared error between the signals or a sum of squares of differences between samples. However, the disclosure is not limited thereto, and the signal match may also be defined in the frequency-domain, which allows the system 100 to use perceptual weighting to account for frequency-dependent sensitivity associated with human hearing. For example, in some examples the system 100 may weight error differently depending on the frequency range, such as associating a relatively low weight value with very low frequencies and very high frequencies that are less audible to human hearing, while associating a relatively high weight value with mid-range frequencies (e.g., frequency ranges in proximity to 3 kHz) that are more audible to human hearing.

The playback audio data 155 may be time-domain audio data or frequency-domain audio data without departing from the disclosure. For example, time-domain audio data may represent an amplitude of audio over time, whereas frequency-domain audio data may represent an amplitude of audio over frequency. Thus, the system 100 may train the preprocessing component 130 in the time-domain or the frequency-domain without departing from the disclosure. While the system 100 may train the preprocessing component 130 in either the time-domain or the frequency-domain, in some examples the preprocessing component 130 may determine optimal values for the same number of weights, coefficients, parameters, and/or the like without departing from the disclosure. Thus, in these examples the number of weights or parameters would not vary between first training in the time-domain and second training in the frequency-domain, although specific values may vary between the first training and the second training. However, the disclosure is not limited thereto and the number of weights, coefficients, parameters and/or the like may vary without departing from the disclosure.

As will be described in greater detail below with regard to FIG. 2, in some examples the preprocessing component 130 may correspond to a preprocessing deep neural network (DNN) component (e.g., trained model) that is configured to apply the nonlinear signal correction described above. For example, the preprocessing DNN component may be trained to linearize and/or offset nonlinear regions of the driver response and/or compensate for the nonlinearities associated with the driver response, resulting in an output signal (e.g., output audio 145) matching an input signal (e.g., playback audio data 125) with minimal distortion. Using the preprocessing training 150 described above, the system 100 may learn optimal weights that the preprocessing DNN component may use to apply the nonlinear signal correction.

As will be described in greater detail below with regard to FIG. 3, in other examples the preprocessing component 130 may correspond to a thermal compressor component and/or an excursion limiter component that are configured to apply the nonlinear signal correction described above. For example, the thermal compressor component and/or an excursion limiter component may be trained to apply dynamic range compression and/or amplitude limiting to reduce the distortion and/or compensate for the nonlinearities associated with the driver response. Using the preprocessing training 150 described above, the system 100 may learn optimal compressor parameters and limiter parameters (e.g., compression thresholds and ratios and/or limiter threshold(s)) that the thermal compressor component and/or the excursion limiter component may use to apply the nonlinear signal correction. In some examples, the compressor parameters may correspond to attack time(s), release time(s), threshold release(s), and/or the like associated with dynamic range compression, while the limiter parameters may correspond to release time(s), threshold value(s), and/or the like associated with amplitude limiting, although the disclosure is not limited thereto.

As will be described in greater detail below with regard to FIG. 4, the preprocessing component 130 may correspond to a combination of the thermal compressor component, the excursion limiter component, and the preprocessing DNN component without departing from the disclosure. For example, using the preprocessing training 150 described above, the system 100 may learn optimal compressor parameters and limiter parameters associated with the thermal compressor component and/or the excursion limiter component and optimal weights associated with the preprocessing DNN component, which the device 110 may use to apply the nonlinear signal correction described above.

While the ideal frequency response example described above maintains a relatively flat frequency response between a first frequency value (e.g., 30 Hz) and a second frequency value (e.g., 17 kHz), this is intended to conceptually illustrate an example and the disclosure is not limited thereto. For example, the first frequency value and/or the second frequency value may vary without departing from the disclosure. In some examples, the ideal frequency response may accurately reproduce desired input signals for most frequencies within a human hearing range (e.g., audible frequency range of approximately 20 Hz-20 kHz), although the disclosure is not limited thereto.

While the ideal frequency response may extend across most of the audible frequency range (e.g., 20 Hz-20 kHz), due to physical limitations a single driver 140 is unlikely to accurately reproduce sounds across the entire audible frequency range. Instead, a larger driver (e.g., woofer) typically produces lower frequencies, while a smaller driver (e.g., tweeter) typically produces higher frequencies. Thus, the device 110 may include one driver configured to reproduce lower frequencies (e.g., bass and/or midrange tones) and another driver configured to reproduce higher frequencies (e.g., midrange, treble, and/or high tones), although the disclosure is not limited thereto.

In some examples, the device 110 may include two drivers with different driver responses. For example, the device 110 may include a first driver 140*a* (e.g., full-range woofer) to generate first output audio 145*a* corresponding to a first frequency band (e.g., 60 Hz-3 kHz), along with a second driver 140*b* (e.g., tweeter) to generate second output audio 145*b* corresponding to a second frequency band (e.g., 3 kHz-18 kHz), although the disclosure is not limited thereto. In other examples, the device 110 may include three drivers with different driver responses. For example, the device 110 may include a first driver 140*a* (e.g., woofer) to generate first output audio 145*a* corresponding to a first frequency band (e.g., 60 Hz-300 Hz), a second driver 140*b* (e.g., midrange driver) to generate second output audio 145*b* corresponding to a second frequency band (e.g., 300 Hz-3 kHz), and a third driver 140*c* (e.g., tweeter) to generate third output audio 145*c* corresponding to a third frequency band (e.g., 3 kHz-18 kHz), although the disclosure is not limited thereto.

While the examples described above use fixed cutoff frequencies and/or crossover frequencies to isolate the drivers, the disclosure is not limited thereto and the cutoff frequencies and/or crossover frequencies may vary between drivers without departing from the disclosure. For example, the two-driver implementation described above used 3 kHz as a cutoff frequency to transition from the first driver 140*a* to the second driver 140*b*. In some examples, however, the first driver 140*a* may generate first output audio 145*a* corresponding to a wider first frequency band (e.g., 60 Hz-6 kHz), while the second driver 140*b* may generate second output audio 145*b* corresponding to the second frequency band (e.g., 3 kHz-18 kHz), resulting in an overlap of the first output audio 145*a* and the second output audio 145*b* between 3 kHz and 6 kHz, although the disclosure is not limited thereto.

The audible frequency range may be divided into a plurality of subranges. For example, the audible frequency range may include a first range of frequencies (e.g., 20 Hz-60 Hz), which may be referred to as a subbass band and/or may reproduce subbass tones, a second range of frequencies (e.g., 60 Hz-250 Hz), which may be referred to as a bass band and/or may reproduce bass tones, a third range of frequencies (e.g., 250 Hz-500 Hz), which may be referred to as a low midrange band and/or may reproduce low-midrange tones, a fourth range of frequencies (e.g., 500 Hz-2 kHz), which may be referred to as a midrange band and/or may reproduce midrange tones, a fifth range of frequencies (e.g., 2 kHz-4 kHz), which may be referred to as an upper midrange band and/or may reproduce upper midrange tones, a sixth range of frequencies (e.g., 4 kHz-6 kHz), which may be referred to as a lower treble band and/or may reproduce lower treble tones, and a seventh range of frequencies (e.g., 6 kHz-20 kHz), which may be referred to as a high band and/or may reproduce high tones.

While the example described above refers to the audible frequency range being divided into seven subranges, the disclosure is not limited thereto. Instead, transition frequencies (e.g., cutoff frequencies and/or crossover frequencies) associated with an individual subrange may vary and/or a number of subranges may vary without departing from the disclosure. Thus, the audible frequency range may be divided into three subranges without departing from the disclosure. For example, a first subrange may include a first range of frequencies (e.g., 20 Hz-300 Hz) that correspond to a bass/midrange band, a second subrange may include a second range of frequencies (e.g., 300 Hz-3 kHz) that correspond to a midrange band, and a third subrange may include a third range of frequencies (e.g., 3 kHz-18 kHz) that correspond to a treble/high band. Additionally or alternatively, the transition frequencies may vary between subranges, such that portions of the subranges may overlap without departing from the disclosure. For example, the second subrange may correspond to a fourth range of frequencies (e.g., 300 Hz-6 kHz), such that the second subrange may overlap the third subrange between 3 kHz and 6 kHz, although the disclosure is not limited thereto.

An audio signal is a representation of sound and an electronic representation of an audio signal may be referred to as audio data, which may be analog and/or digital without departing from the disclosure. For ease of illustration, the disclosure may refer to either audio data (e.g., reference audio data or playback audio data, microphone audio data or input audio data, etc.) or audio signals (e.g., playback signals, microphone signals, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), noise reduction (NR) processing, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

A gain value is an amount of gain (e.g., amplification or attenuation) to apply to the input energy level to generate an output energy level. For example, the device 110 may apply the gain value to the input audio data to generate output audio data. A positive dB gain value corresponds to amplification (e.g., increasing a power or amplitude of the output audio data relative to the input audio data), whereas a negative dB gain value corresponds to attenuation (decreasing a power or amplitude of the output audio data relative to the input audio data). For example, a gain value of 6 dB corresponds to the output energy level being twice as large as the input energy level, whereas a gain value of −6 dB corresponds to the output energy level being half as large as the input energy level.

Figure 2:
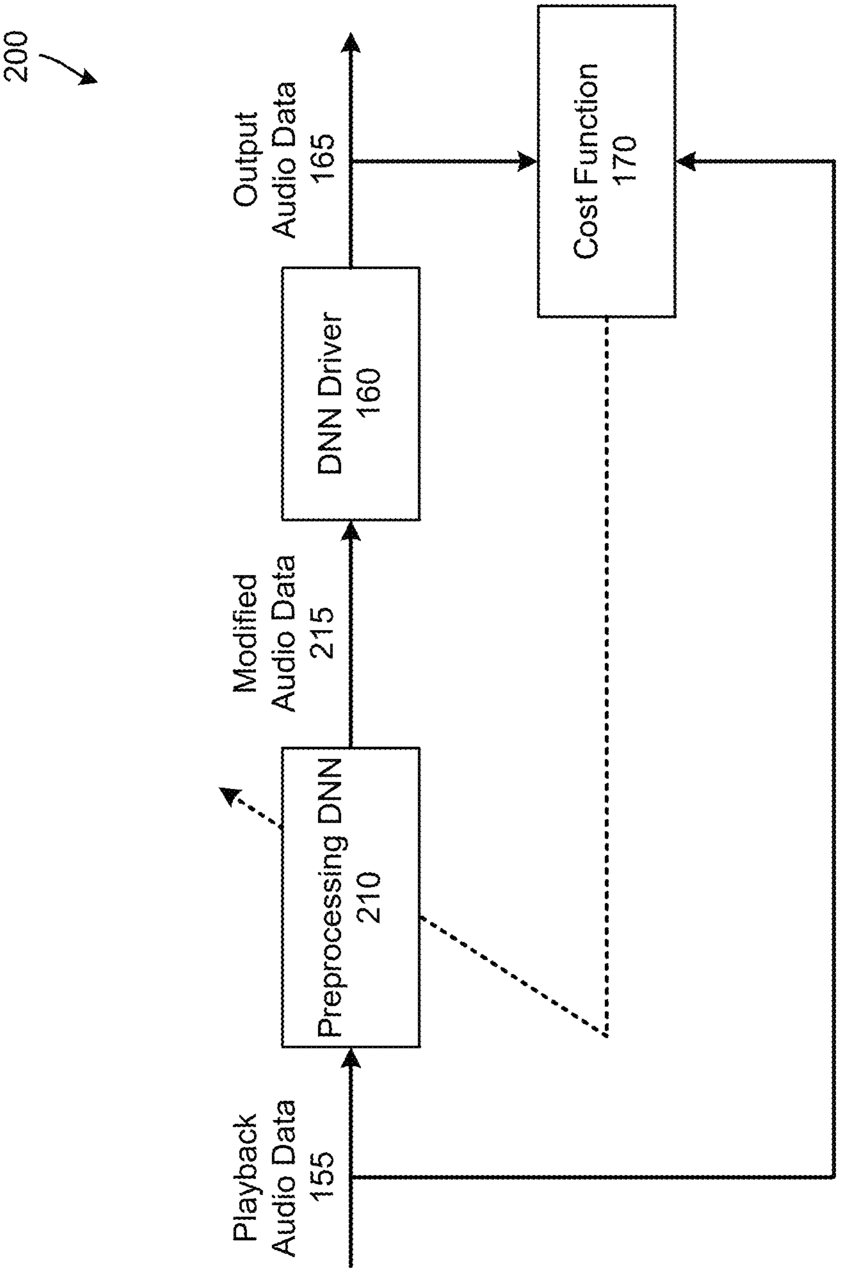
FIG. 2 illustrates an example component diagram for applying nonlinear signal correction using a neural network according to embodiments of the present disclosure.

FIG. 2 illustrates an example component diagram for applying nonlinear signal correction using a neural network according to embodiments of the present disclosure. As illustrated in FIG. 2, in some examples the preprocessing component 130 may correspond to a preprocessing deep neural network (DNN) component 210 (e.g., trained model) that is configured to apply the nonlinear signal correction described above. For example, the preprocessing DNN component 210 may be trained to linearize and/or offset nonlinear regions of the driver response and/or compensate for the nonlinearities associated with the driver response, using techniques similar to the preprocessing component 130 described above with regard to FIG. 1, although the disclosure is not limited thereto.

To illustrate an example, the DNN driver component 160 may be trained to model a driver response associated with the loudspeaker 114. For example, the DNN driver component 160 may model the entire driver response of the driver 140, including both linear regions of operation and nonlinear regions of operation. While portions of the linear regions of the driver response may have lower gain values than a desired gain value and/or may deviate from the ideal frequency response, these deviations correspond to linear distortions that determine tonal characteristics associated with the loudspeaker 114. For example, linear distortion does not produce new and unwanted signals and therefore does not correspond to undesirable distortion. In contrast, the portions of the nonlinear regions of operation may introduce new and unwanted signals (e.g., spurious harmonics) that may result in harmonic distortion, intermodulation distortion, and/or the like.

Using the DNN driver component 160, the system 100 may train the preprocessing DNN component 210 to linearize and/or offset the nonlinear behavior of the driver response (e.g., nonlinear regions of operation). For example, once the preprocessing DNN component 210 is trained, the preprocessing DNN component 210 may extrapolate for any input signal and pre-distort based on the driver response (e.g., nonlinear distortion) to attempt to linearize and offset the driver response. Thus, a combination of the preprocessing DNN component 210 and the DNN driver component 160 may result in a linear driver response with reduced harmonic distortion, intermodulation distortion, and/or the like caused by the nonlinear regions of the driver response.

In some examples, the driver response may correspond to a first vector of complex numbers having a first size (e.g., N×1 vector, where N denotes a number of frequency bands). During training, the preprocessing DNN component 210 may learn optimal weights that enable the preprocessing DNN component 210 to linearize and/or offset nonlinearities and/or nonlinear regions of the driver response. Thus, the optimal weight values learned by the preprocessing DNN component 210 may correspond to a second vector of complex numbers having the first size. Under ideal conditions, applying the second vector and the first vector may result in a linear frequency response.

The disclosure is not limited thereto, however, and in other examples the driver response may correspond to a third vector of relative gain values having the first size. In this example, the optimal weight values learned by the preprocessing DNN component 210 may correspond to a fourth vector of relative gain values. To illustrate a simple example, a positive gain value (e.g., +10 dB) represented in the third vector may correspond to an opposite negative gain value (e.g., −10 dB) represented in the fourth vector, while a negative gain value (e.g., −10 dB) represented in the third vector may correspond to an opposite positive gain value (e.g., +10 dB) represented in the fourth vector, although the disclosure is not limited thereto. Thus, adding a gain value from the third vector with a corresponding gain value from the fourth vector may result in a neutral gain value (e.g., 0 dB). However, the disclosure is not limited thereto and the example described above is intended to conceptually illustrate a simple example of how the fourth vector may compensate for the driver response when combined with the third vector. In practice, the fourth vector may compensate for the driver response in a variety of ways without departing from the disclosure, such as by linearizing nonlinear regions of the driver response. Additionally or alternatively, the fourth vector may include additional gain values and/or otherwise compensate for new and unwanted signals (e.g., spurious harmonics) that may result in harmonic distortion, intermodulation distortion, and/or the like without departing from the disclosure.

In the examples described above, the vectors share the first size (e.g., N×1 vector), which may correspond to a first frequency range (e.g., 0 kHz to 22 kHz) divided into N frequency bands. However, the disclosure is not limited thereto, and a frequency range associated with the first size may vary without departing from the disclosure. Additionally or alternatively, the vectors may have different sizes without departing from the disclosure. For example, the first/third vector may have a second size corresponding to a second frequency range (e.g., 0 kHz to 4 kHz) while the second/fourth vector may have a third size corresponding to a third frequency range (e.g., 0 kHz to 22 kHz) without departing from the disclosure. Thus, in some examples the second/fourth vector may correspond to a larger frequency range than the first/third vector, although the disclosure is not limited thereto.

For ease of illustration, the examples described above may refer to the second/fourth vector compensating for the first/third vector modeling the driver response. However, the disclosure is not limited thereto, and the second/fourth vector may compensate for nonlinear regions of the first/third vector without departing from the disclosure.

During preprocessing DNN training 200 illustrated in FIG. 2, the system 100 may train the preprocessing DNN component 210 to learn optimal parameters (e.g., parameter values) based on the driver response (e.g., nonlinearities associated with the driver response). In some examples, the system 100 may use the cost function 170 to train the preprocessing DNN component 210 by adapting weight values associated with the preprocessing DNN component 210 to minimize the error data. Using the weight values, the preprocessing DNN component 210 may apply the nonlinear signal correction to the playback audio data 155 to generate modified audio data 215 to send to the DNN driver component 160. While the example described above refers to the cost function 170 minimizing the error data, the disclosure is not limited thereto and in some examples the system 100 may define the cost function 170 as a weighted sum of two terms, one maximizing fidelity and the other maximizing loudness, although the disclosure is not limited thereto.

As illustrated in FIG. 2, the system 100 may perform the preprocessing DNN training 200 to train the preprocessing DNN component 210 by connecting the preprocessing DNN component 210 and the DNN driver component 160 in series in a cascade configuration. For example, the preprocessing DNN component 210 may process the playback audio data 155 to generate modified audio data 215 and then the DNN driver component 160 may process the modified audio data 215 to generate the output audio data 165. For ease of explanation, the combination of the preprocessing DNN component 210 and the DNN driver component 160 may be referred to as the cascade system.

During the preprocessing DNN training 200, the cascaded system is trained to perform an identity operation (e.g., same audio signal is presented as input and output). For example, the cascaded system is trained to generate output audio data 165 that is identical to the playback audio data 155, such that a difference between the playback audio data 155 and the output audio data 165 is minimized. Thus, in order to generate output audio data 165 that is identical to the playback audio data 155, the preprocessing DNN component 210 must compensate for (e.g., offset) any nonlinearities and/or distortion caused by the DNN driver component 160.

As the DNN driver component 160 was previously trained and is configured to use fixed weight values (e.g., weights of the DNN driver component 160 are frozen), only the preprocessing DNN component 210 is trained during the preprocessing DNN training 200 (e.g., only parameters associated with the preprocessing DNN component 210 are updated). However, the DNN driver component 160 may enable backpropagation without adapting weights of the DNN driver component 160, for example using a gradient descent technique with a constrained sum. Therefore, during the preprocessing DNN training 200 the preprocessing DNN component 210 may learn to apply nonlinear signal correction to predistort the modified audio data 215 in such a way that linearizes and/or offsets nonlinear regions of the driver response associated with the DNN driver component 160, resulting in minimal input/output distortion. For example, the preprocessing DNN component 210 may use the playback audio data 155 to determine how to generate the modified audio data 215 to offset the nonlinear distortion associated with the DNN driver component 160.

As illustrated in FIG. 2, the system 100 may use the cost function 170 to adapt the preprocessing DNN component 210 and determine optimal weights for the preprocessing DNN component 210 during the preprocessing DNN training 200. In some examples, the cost function 170 may measure a difference between the playback audio data 155 (e.g., target output) and the output audio data 165 (e.g., computed output). For example, the system 100 may calculate the error data (e.g., error signal) by subtracting the playback audio data 155 from the output audio data 165. The cost function 170 may then train the preprocessing DNN component 210 by updating weight values associated with the preprocessing DNN component 210 to minimize the error data. While the example described above refers to the cost function 170 minimizing the error data, the disclosure is not limited thereto and in some examples the system 100 may define the cost function 170 as a weighted sum of two terms, one maximizing fidelity and the other maximizing loudness, although the disclosure is not limited thereto.

While the above description refers to the system 100 training the preprocessing DNN component 210 using certain techniques (e.g., backpropagation), the disclosure is not limited thereto. In some examples, the system 100 may use other optimization criteria to train the preprocessing DNN component 210 without departing from the disclosure. For example, the system 100 may train the preprocessing DNN component 210 (e.g., find an optimal neural network and/or optimal weight values) using other objective function definitions, searching a parameter space for optimal parameters using a genetic algorithm, particle filter, etc., and/or using other techniques without performing backpropagation or departing from the disclosure. In some examples, the system 100 may use these techniques to train the preprocessing DNN component 210 even without the DNN driver component 160 modeling the loudspeaker frequency response, although the disclosure is not limited thereto.

The playback audio data 155 may be time-domain audio data or frequency-domain audio data without departing from the disclosure. For example, time-domain audio data may represent an amplitude of audio over time, whereas frequency-domain audio data may represent an amplitude of audio over frequency. Thus, the system 100 may train the preprocessing DNN component 210 in the time-domain or the frequency-domain without departing from the disclosure. For example, in some examples the system 100 may weight error differently depending on the frequency range, such as associating a relatively low weight value with very low frequencies and very high frequencies that are less audible to human hearing, while associating a relatively high weight value with midrange frequencies (e.g., frequency ranges in proximity to 3 kHz) that are more audible to human hearing.

While the system 100 may train the preprocessing DNN component 210 in either the time-domain or the frequency-domain, in some examples the preprocessing DNN component 210 may determine optimal values for the same number of weights without departing from the disclosure. Thus, in these examples the number of weights would not vary between first training in the time-domain and second training in the frequency-domain, although specific values may vary between the first training and the second training.

However, the disclosure is not limited thereto and in other examples the number of weights may vary without departing from the disclosure.

Figure 3:
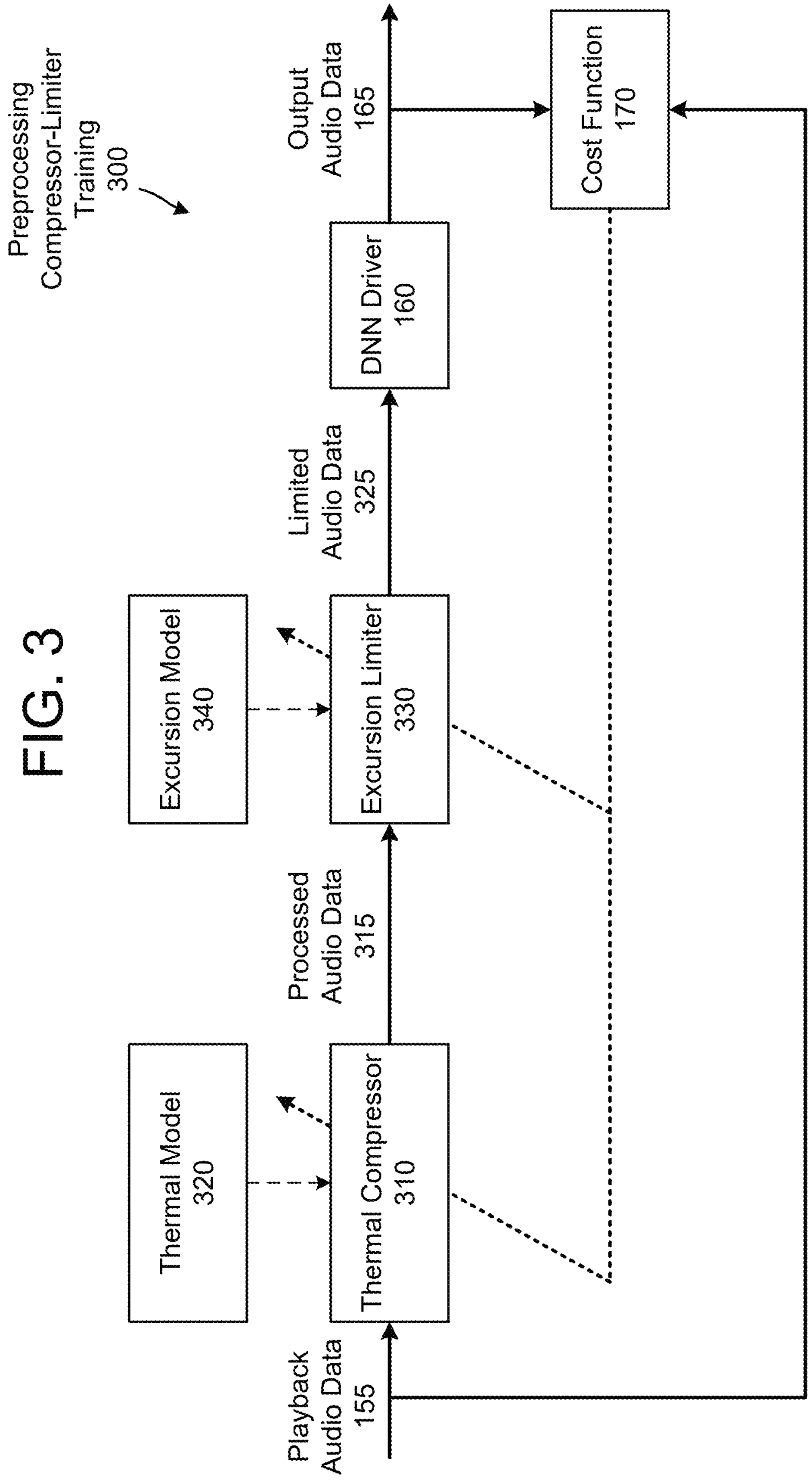
FIG. 3 illustrates an example component diagram for applying nonlinear signal correction using a thermal compressor and an excursion limiter according to embodiments of the present disclosure.

FIG. 3 illustrates an example component diagram for applying nonlinear signal correction using a thermal compressor and an excursion limiter according to embodiments of the present disclosure. As illustrated in FIG. 3, in other examples the preprocessing component 130 may correspond to a thermal compressor component 310 and/or an excursion limiter component 330 that are configured to apply the nonlinear signal correction described above without departing from the disclosure. For example, the thermal compressor component 310 and/or the excursion limiter component 330 may be trained to apply dynamic range compression and/or amplitude limiting techniques to reduce the distortion and/or compensate for the nonlinearities associated with the driver response using techniques similar to the preprocessing component 130 described above with regard to FIG. 1, although the disclosure is not limited thereto.

During the preprocessing compressor-limiter training 300 illustrated in FIG. 3, the cascaded system (e.g., combination of the thermal compressor component 310, the excursion limiter component 330, and the DNN driver component 160) is trained to perform an identity operation (e.g., same audio signal is presented as input and output). For example, the cascaded system is trained to generate output audio data 165 that is identical to the playback audio data 155, such that a difference between the playback audio data 155 and the output audio data 165 is minimized. Thus, in order to generate output audio data 165 that is identical to the playback audio data 155, the thermal compressor component 310 and/or the excursion limiter component 330 must compensate for (e.g., offset) any nonlinearities and/or distortion caused by the DNN driver component 160.

While the preprocessing DNN component 210 applies nonlinear signal correction by learning optimal weight values that may be directly applied to the playback audio data 155, the preprocessing compressor-limiter training 300 applies nonlinear signal correction indirectly by adjusting parameters associated with a dynamic range compressor (DRC) and/or an amplitude limiter instead. For example, during the preprocessing compressor-limiter training 300, the system 100 may learn optimal parameters with which to apply dynamic range compression based on a thermal model 320 of the driver 140 and/or amplitude limiting based on an excursion model 340 of the driver 140.

As illustrated in FIG. 3, the driver 140 may be characterized by a thermal model 320 and/or an excursion model 340 that the system 100 may use to estimate a temperature and/or an excursion associated with the driver 140 for any input signal. For example, the thermal model 320 may determine temperature data corresponding to a temperature of the loudspeaker 114, while the excursion model 340 may determine excursion data corresponding to a position of a membrane of the loudspeaker 114. Thus, the temperature data may represent a temperature of the loudspeaker 114 over time, while the excursion data may represent an excursion (e.g., displacement) of a membrane of the loudspeaker 114 over time.

The system 100 may generate the thermal model 320 and/or the excursion model 340 by physically testing the driver 140 and/or performing virtual simulations without departing from the disclosure. For example, the system 100 may estimate the thermal model 320 and/or the excursion model 340 by performing experiments in a laboratory environment and recording actual measurement data associated with the driver 140. However, the disclosure is not limited thereto, and the system 100 may estimate the thermal model 320 and/or the excursion model 340 by performing simulations that estimate measurement data using a digital model of the driver 140 without departing from the disclosure.

Referring back to FIG. 3, the thermal model 320 may be calculated previously and may be configured to predict a temperature of the driver 140 (e.g., voice-coil heating) based on the playback audio data 155. For example, given an input root mean squared (RMS) level and frequency content of the playback audio data 155, the thermal model 320 may determine an estimated temperature value, although the disclosure is not limited thereto. The thermal model 320 may enable the thermal compressor component 310 to compress audio signals by applying a time-varying, frequency-dependent compression gain in order to compress temperature variations. Thus, the thermal model 320 may enable the thermal compressor component 310 to convert between the RMS level (e.g., average voltage level or average power level) of the playback audio data 155 and the estimated temperature without departing from the disclosure.

Similarly, the excursion model 340 may be calculated previously and may be configured to predict an amount of excursion associated with the driver 140 (e.g., membrane excursion) based on the processed audio data 315. For example, given the input amplitude level and frequency content of the processed audio data 315, the excursion model 340 may determine an estimated excursion value, although the disclosure is not limited thereto. The excursion model 340 may enable the excursion limiter component 330 to limit audio signals by a frequency-dependent threshold, which effectively limits the driver excursion to a constant value in millimeters. Thus, the excursion model 340 may enable the system 100 to convert between an amplitude level (e.g., instantaneous voltage level) of the processed audio data 315 and the amount of excursion without departing from the disclosure.

While the thermal compressor component 310 and the excursion limiter component 330 are both configured to modify the playback audio data 155 to prevent physical characteristics of the driver 140 (e.g., temperature and excursion) from exceeding a threshold value, they may perform this operation differently without departing from the disclosure. For example, the thermal compressor component 310 may be configured to perform dynamic range compression based on an average power level over time (e.g., RMS level), while the excursion limiter component 330 may be configured to perform amplitude limiting (e.g., "soft" limiting) based on instantaneous voltage values (e.g., maximum amplitude), although the disclosure is not limited thereto.

To illustrate an example, the excursion limiter component 330 may correspond to a soft limiter, which is a form of dynamic range compression and may dynamically adjust an attenuation applied to an input audio signal so that peaks are (in an ideal system) reduced to be within the confines of the limits. Thus, dynamic range compression reduces a volume level of loud sounds by narrowing or compressing an audio signal's dynamic range. Soft limiters engage in downward compression, reducing the volume level of loud sounds that have peaks outside of the limits. While the attenuation is held constant, the original shape of the wave is retained; as the soft limiter ramps up or ramps down attenuation, however, the shape of the wave is subtly altered, with distortion introducing harmonic components into the waveform. For example, the faster the attenuation ramps up (referred to as the "attack") and ramps down (referred to as the "release"), the greater an amount of distortion.

As described above, the thermal compressor component 310 may perform dynamic range compression, and the thermal model 320 may enable the thermal compressor component 310 to compress audio signals by applying a time-varying, frequency-dependent compression gain in order to compress temperature variations. For example, the thermal compressor component 310 may determine first gain data by compressing a first dynamic range of the temperature data. As a dynamic range of data corresponds to an amount of variation of a variable in the data, compressing the dynamic range corresponds to reducing the amount of variation. For example, the dynamic range of the temperature data may be 10-30 degrees Celsius, while a corresponding compressed dynamic range may be, for example, 15-25 degrees Celsius.

Similarly, the excursion model 340 enables the excursion limiter component 330 to limit audio signals by a frequency-dependent threshold. If the excursion limiter component 330 is implemented using soft limiting, the excursion limiter component 330 may determine second gain data by compressing a second dynamic range of the excursion data. For example, the excursion limiter component 330 may determine an amount of attenuation to apply based on a maximum voltage amplitude (e.g., instantaneous voltage values) of the audio signal. In some examples, the excursion limiter component 330 may process the full-band audio data to remove undesired amplitude peaks (e.g., prevent the full-band audio signal from exceeding positive and negative maximum amplitude limits). For example, the excursion limiter component 330 may suppress any portion of the full-band audio data that has a peak that is greater than an upper amplitude limit or less than a lower amplitude limit. The excursion limiter component 330 may, for example, attenuate the full-band audio data such that any peaks of full-band output audio signal remain within the maximum amplitude limits. Limiting said amplitude peaks may lessen or prevent damage to any circuitry or components of the device 110 and/or reduce the total harmonic distortion of the full-band audio data.

During preprocessing compressor-limiter training 300 illustrated in FIG. 3, the system 100 may train the thermal compressor component 310 and/or the excursion limiter component 330 to learn optimal parameters associated with performing dynamic range compression and/or amplitude limiting. In some examples, the system 100 may use the cost function 170 to train the thermal compressor component 310 by adapting compressor parameters (e.g., compression thresholds, ratios, attack time(s), release time(s), threshold release(s), and/or the like) associated with performing dynamic range compression to minimize the error data, although the disclosure is not limited thereto. Similarly, the system 100 may use the cost function 170 to train the excursion limiter component 330 by adapting limiter parameters (e.g., limiter threshold value(s), release time(s), and/or the like) associated with performing amplitude limiting to minimize the error data, although the disclosure is not limited thereto. While the example described above refers to the cost function 170 minimizing the error data, the disclosure is not limited thereto and in some examples the system 100 may define the cost function 170 as a weighted sum of two terms, one maximizing fidelity and the other maximizing loudness, although the disclosure is not limited thereto.

As illustrated in FIG. 3, using the thermal model 320 and the compressor parameters (e.g., compression thresholds, ratios, attack time(s), release time(s), threshold release(s), and/or the like), the thermal compressor component 310 may apply nonlinear signal correction to the playback audio data 155 to generate processed audio data 315 that is sent to the excursion limiter component 330. For example, the thermal compressor component 310 may determine first gain data that compresses the first dynamic range of the temperature data and may apply the first gain data to the playback audio data 155 to generate the processed audio data 315. Using the excursion model 340 and limiter parameters (e.g., limiter threshold value(s), release time(s), and/or the like), the excursion limiter component 330 may apply nonlinear signal correction to the processed audio data 315 to generate limited audio data 325 that is sent to the DNN driver component 160. For example, the excursion limiter component 330 may determine second gain data that compresses the second dynamic range of the excursion data and may apply the second gain data to the processed audio data 315 to generate the limited audio data 325. The DNN driver component 160 may then use the limited audio data 325 to generate the output audio data 165.

In some examples, the thermal compressor component 310 and the excursion limiter component 330 may modify the playback audio data 155 in a way that compensates for the driver response. For example, the limited audio data 325 may be generated by preprocessing the playback audio data 155 (e.g., pre-distorting the signal) to account for a nonlinear response of the driver 140. While the driver response may be nonlinear, suffer from reduced gain levels, and/or depart from the ideal frequency response in other ways, a combination of the preprocessing and the driver response may result in a combined response that is linear and/or compensates for the nonlinear driver response. For example, applying the driver response to the limited audio data 325 may result in the output audio 145 generated by the driver 140 accurately reproducing the playback audio data 155 input to the thermal compressor component 310. Thus, the preprocessing performed by the thermal compressor component 310 and the excursion limiter component 330 may compensate for nonlinearities in the physical system.

In some examples, the thermal compressor component 310 and/or the excursion limiter component 330 may correspond to filters, such as finite-impulse response (FIR) and infinite-impulse response (IIR) filters, that generate an output (e.g., compressed data) by applying a variable gain based on the thermal data or excursion data. For example, a filter may correspond to a FIR filter g(k) with filter length N (e.g., k=1, 2, . . . , N), although the disclosure is not limited thereto. If the thermal data and/or excursion data indicates a temperature and/or excursion greater than a temperature threshold and/or excursion threshold, the thermal compressor component 310 and/or the excursion limiter component 330 may generate output data by compressing the input data (e.g., applying a gain less than 1.0). If, on the other hand, the thermal data and/or excursion data indicates a temperature and/or excursion less than the temperature threshold and/or excursion threshold, the thermal compressor component 310 and/or the excursion limiter component 330 may pass the corresponding data with no compression effect (e.g., applying a gain factor of 1.0). A range of gains to be applied to input values may correspond to a gain curve for each of the thermal compressor component 310 and/or the excursion limiter component 330.

In some examples, the excursion data may change much more rapidly than the temperature data. For example, the excursion data may increase or decrease as audio output data increases or decreases in magnitude. In contrast, the temperature data may increase after a period of time in which the excursion data indicates high excursions and may decrease after a period of time in which the excursion data indicates low excursions.

While the above description refers to the system 100 training the thermal compressor component 310 and/or the excursion limiter component 330 using certain techniques (e.g., backpropagation), the disclosure is not limited thereto. In some examples, the system 100 may use other optimization criteria to train the thermal compressor component 310 and/or the excursion limiter component 330 without departing from the disclosure. For example, the system 100 may train the thermal compressor component 310 and/or the excursion limiter component 330 (e.g., find optimal parameter values) using other objective function definitions, searching a parameter space for optimal parameters using a genetic algorithm, particle filter, etc., and/or using other techniques without performing backpropagation or departing from the disclosure. In some examples, the system 100 may use these techniques to train the thermal compressor component 310 and/or the excursion limiter component 330 even without the DNN driver component 160 modeling the loudspeaker frequency response, although the disclosure is not limited thereto.

While FIG. 3 illustrates the components of the system 100 in a particular order, the components described may be included in a different order without departing from the intent of the disclosure. For example, the excursion limiter component 330 may process the playback audio data 155 and send the limited audio data 325 to the thermal compressor component 310 without departing from the disclosure. Additionally or alternatively, the thermal compressor component 310 and the excursion limiter component 330 may be in parallel to each other, instead of in series, without departing from the disclosure.

Figure 4:
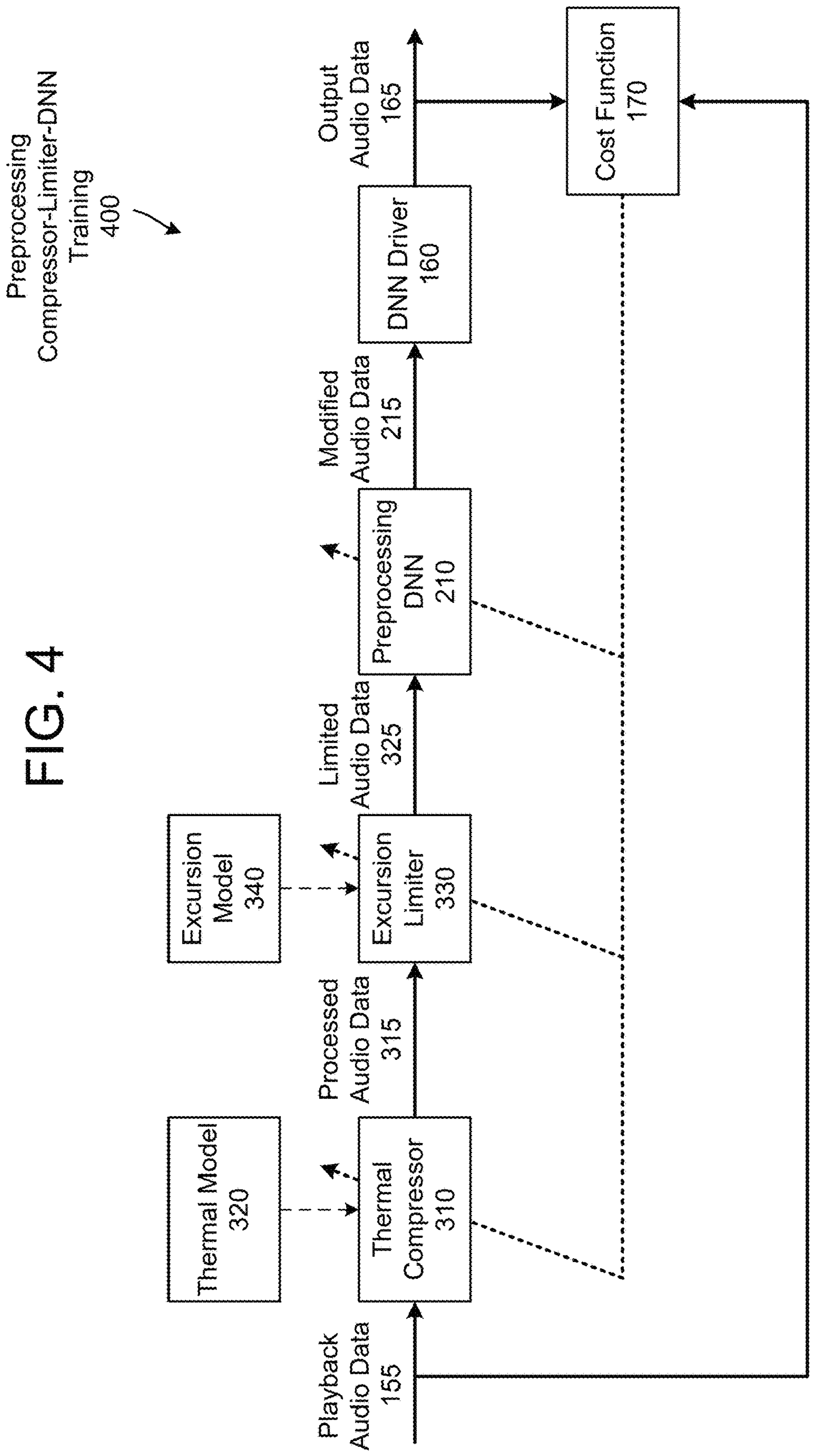
FIG. 4 illustrates an example component diagram for applying nonlinear signal correction using a combination of a thermal compressor, an excursion limiter, and a neural network according to embodiments of the present disclosure.

FIG. 4 illustrates an example component diagram for applying nonlinear signal correction using a combination of a thermal compressor, an excursion limiter, and a neural network according to embodiments of the present disclosure. As illustrated in FIG. 4, in some examples the preprocessing component 130 may correspond to a combination of the thermal compressor component 310, the excursion limiter component 330, and the preprocessing DNN component 210 without departing from the disclosure. For example, the system 100 may apply the nonlinear signal correction described above by learning optimal compressor parameters and limiter parameters associated with the thermal compressor component and/or the excursion limiter component, along with optimal weights associated with the preprocessing DNN component.

As each of the components illustrated in FIG. 4 were described in greater detail above, a redundant description is omitted. Thus, each of these components function similarly to the corresponding components described above with regard to FIGS. 2-3, but may have different sizes and/or operating parameters, although the disclosure is not limited thereto.

While FIG. 4 illustrates a preprocessing compressor-limiter-DNN training example 400 in which the preprocessing DNN component 210 is positioned last (e.g., closest to the DNN driver component 160), the disclosure is not limited thereto. Instead, the system 100 may place the preprocessing DNN component 210 first (e.g., furthest from the DNN driver component 160) without departing from the disclosure. For example, while placing the preprocessing DNN component 210 first may complicate training, the thermal compressor component 310 and the excursion limiter component 330 both enable backpropagation techniques to train the preprocessing DNN component 210.

While FIG. 4 illustrates the components of the system 100 in a particular order, the components described may be included in a different order without departing from the intent of the disclosure. For example, the excursion limiter component 330 may process the playback audio data 155 and send the limited audio data 325 to the thermal compressor component 310 without departing from the disclosure. Additionally or alternatively, the thermal compressor component 310 and the excursion limiter component 330 may be in parallel to each other, instead of in series, without departing from the disclosure.

Figure 5A:
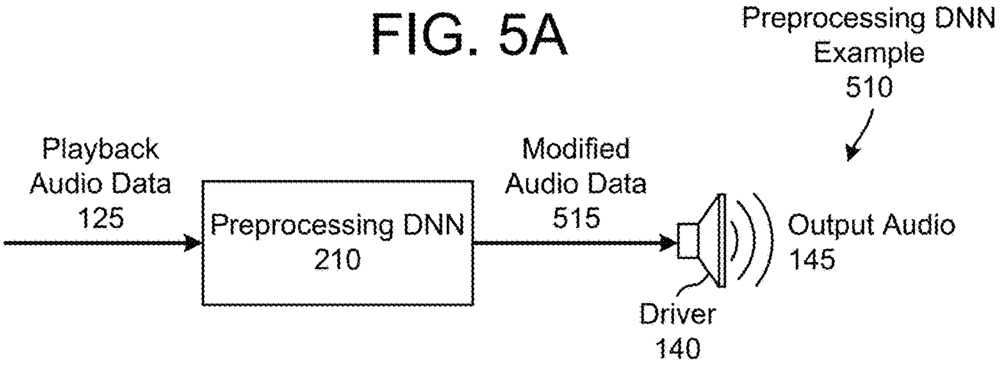
FIGS. 5A-5C illustrate examples of applying nonlinear signal correction while generating output audio according to embodiments of the present disclosure.
Figure 5B:
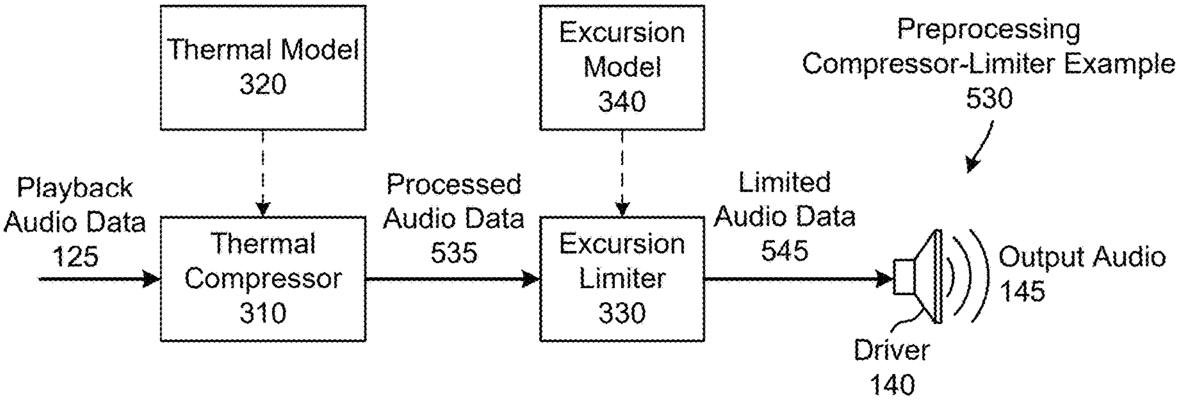
Figure 5C:
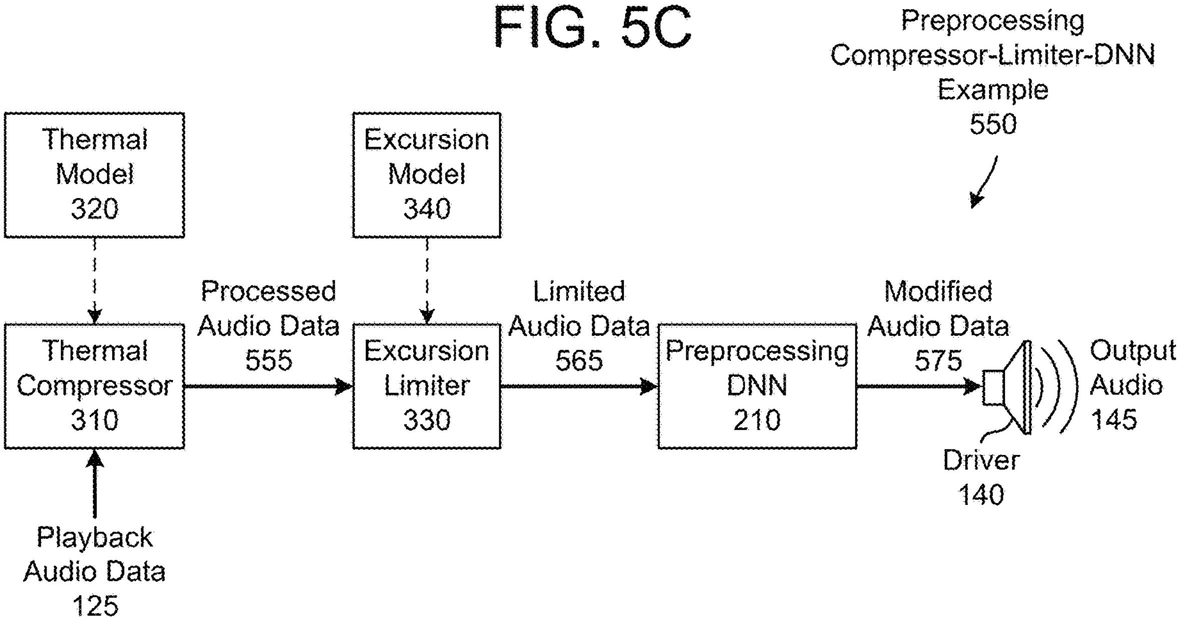

FIGS. 5A-5C illustrate examples of applying nonlinear signal correction while generating output audio according to embodiments of the present disclosure. As described above, the physical limitations of the driver 140 may limit loudness and fidelity of the output audio 145, especially at higher volume levels. Thus, when high temperature conditions, over-excursion, and/or high volume levels are present, the driver response associated with the driver 140 may be significantly impaired. For example, the driver response may be nonlinear and/or have reduced gain levels, which may result in undesirable distortion in the output audio 145. This will negatively impact audio fidelity, especially bass reproduction, and speech recognition performance.

As illustrated in FIG. 5A, in some examples the device 110 may reduce this distortion by including a preprocessing DNN component 210 that is configured to apply nonlinear signal correction to compensate for the nonlinear driver response. As illustrated in preprocessing DNN example 510, the preprocessing DNN component 210 may receive playback audio data 125 and apply nonlinear signal correction to generate modified audio data 515 with which the driver 140 may generate the output audio 145.

In some examples, the preprocessing DNN component 210 may modify the playback audio data 125 in a way that linearizes and/or offsets nonlinear regions of the driver response. For example, the preprocessing DNN component 210 may generate the modified audio data 515 by preprocessing the playback audio data 125 (e.g., pre-distorting the signal) to account for a nonlinear response of the driver 140. While the driver response may be nonlinear, suffer from reduced gain levels, and/or depart from the ideal frequency response in other ways, a combination of the preprocessing and the driver response may result in a combined response that is linear and/or compensates for the nonlinear driver response. For example, applying the driver response to the modified audio data 515 may result in the output audio 145 generated by the driver 140 accurately reproducing the playback audio data 125 input to the preprocessing DNN component 210. Thus, the preprocessing performed by the preprocessing DNN component 210 may compensate for nonlinearities in the physical system.

As illustrated in FIG. 5B, in other examples the device 110 may reduce the distortion by including the thermal compressor component 310 and the excursion limiter component 330, and both may be configured to apply nonlinear signal correction to compensate for a portion of the nonlinear driver response. For example, the thermal compressor component 310 may be configured to perform dynamic range compression, the excursion limiter component 330 may be configured to perform amplitude limiting, and the combination of the dynamic range compression and the amplitude limiting may reduce the distortion and/or compensate for the nonlinearities associated with the driver response.

As illustrated in preprocessing compressor-limiter example 530, using the thermal model 320 and the compressor parameters (e.g., compression thresholds, ratios, attack time(s), release time(s), threshold release(s), and/or the like), the thermal compressor component 310 may apply nonlinear signal correction to the playback audio data 125 to generate processed audio data 535. Using the excursion model 340 and limiter parameters (e.g., limiter threshold value(s), release time(s), and/or the like), the excursion limiter component 330 may apply nonlinear signal correction to the processed audio data 535 to generate limited audio data 545 with which the driver 140 may generate the output audio 145.

In some examples, the thermal compressor component 310 and the excursion limiter component 330 may modify the playback audio data 125 in a way that compensates for the nonlinear driver response. For example, the limited audio data 545 may be generated by preprocessing the playback audio data 125 (e.g., pre-distorting the signal) to account for a nonlinear response of the driver 140. While the driver response may be nonlinear, suffer from reduced gain levels, and/or depart from the ideal frequency response in other ways, a combination of the preprocessing and the driver response may result in a combined response that is linear and/or compensates for the nonlinear driver response. For example, applying the driver response to the limited audio data 545 may result in the output audio 145 generated by the driver 140 accurately reproducing the playback audio data 125 input to the thermal compressor component 310. Thus, the preprocessing performed by the thermal compressor component 310 and the excursion limiter component 330 may compensate for nonlinearities in the physical system.

As illustrated in FIG. 5C, in other examples the device 110 may reduce the distortion by including the thermal compressor component 310, the excursion limiter component 330, and the preprocessing DNN component 210. As these components are described in detail above, a redundant description is omitted.

As illustrated in preprocessing compressor-limiter-DNN example 550, using the thermal model 320 and the compressor parameters (e.g., compression thresholds, ratios, attack time(s), release time(s), threshold release(s), and/or the like), the thermal compressor component 310 may apply nonlinear signal correction to the playback audio data 125 to generate processed audio data 555. Using the excursion model 340 and limiter parameters (e.g., limiter threshold value(s), release time(s), and/or the like), the excursion limiter component 330 may apply nonlinear signal correction to the processed audio data 555 to generate limited audio data 565. Using the weight values, the preprocessing DNN component 210 may apply nonlinear signal correction to the limited audio data 565 to generate modified audio data 575 with which the driver 140 may generate the output audio 145.

Figure 6:
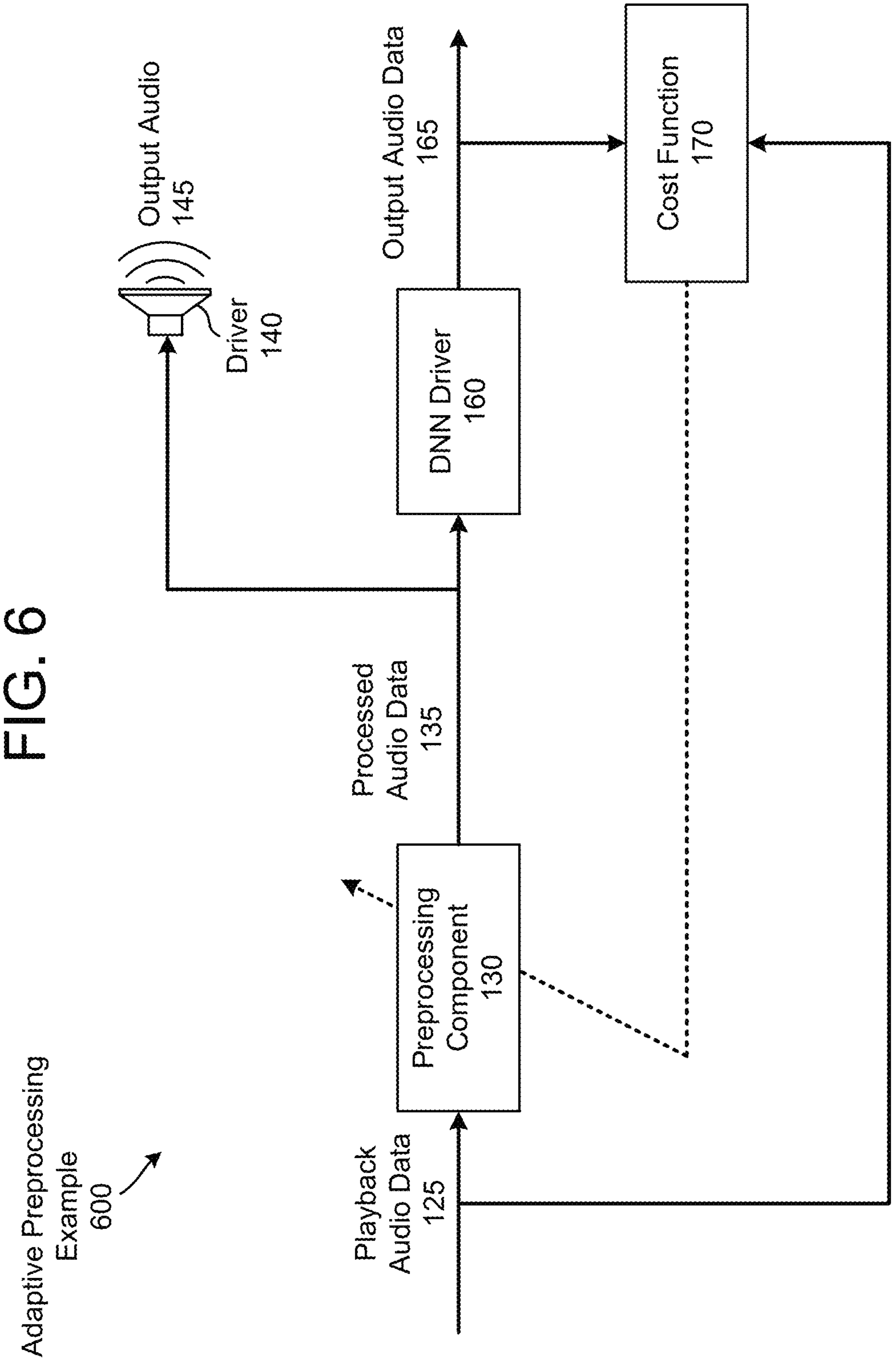
FIG. 6 illustrates an example component diagram for adaptively applying nonlinear signal correction while generating output audio according to embodiments of the present disclosure.

FIG. 6 illustrates an example component diagram for adaptively applying nonlinear signal correction while generating output audio according to embodiments of the present disclosure. While FIG. 1 illustrated a static example in which the preprocessing component 130 was trained using the DNN driver component 160 and then the trained preprocessing component 130 was used to generate output audio 145 by the driver 140, the disclosure is not limited thereto. In some examples, the preprocessing component 130 may be adaptive and the device 110 may continue to train the preprocessing component 130 while generating the output audio 145.

As illustrated in FIG. 6, in an adaptive preprocessing example 600 the preprocessing component 130 is connected to both the driver 140 and the DNN driver component 160. For example, the device 110 may generate the output audio 145 using the driver 140 while simultaneously adapting the preprocessing component 130. However, the preprocessing component 130 is not updated based on the output audio 145, but is instead updated using output audio data 165 generated by the DNN driver component 160 as it continues to model the driver 140.

Figure 7A:
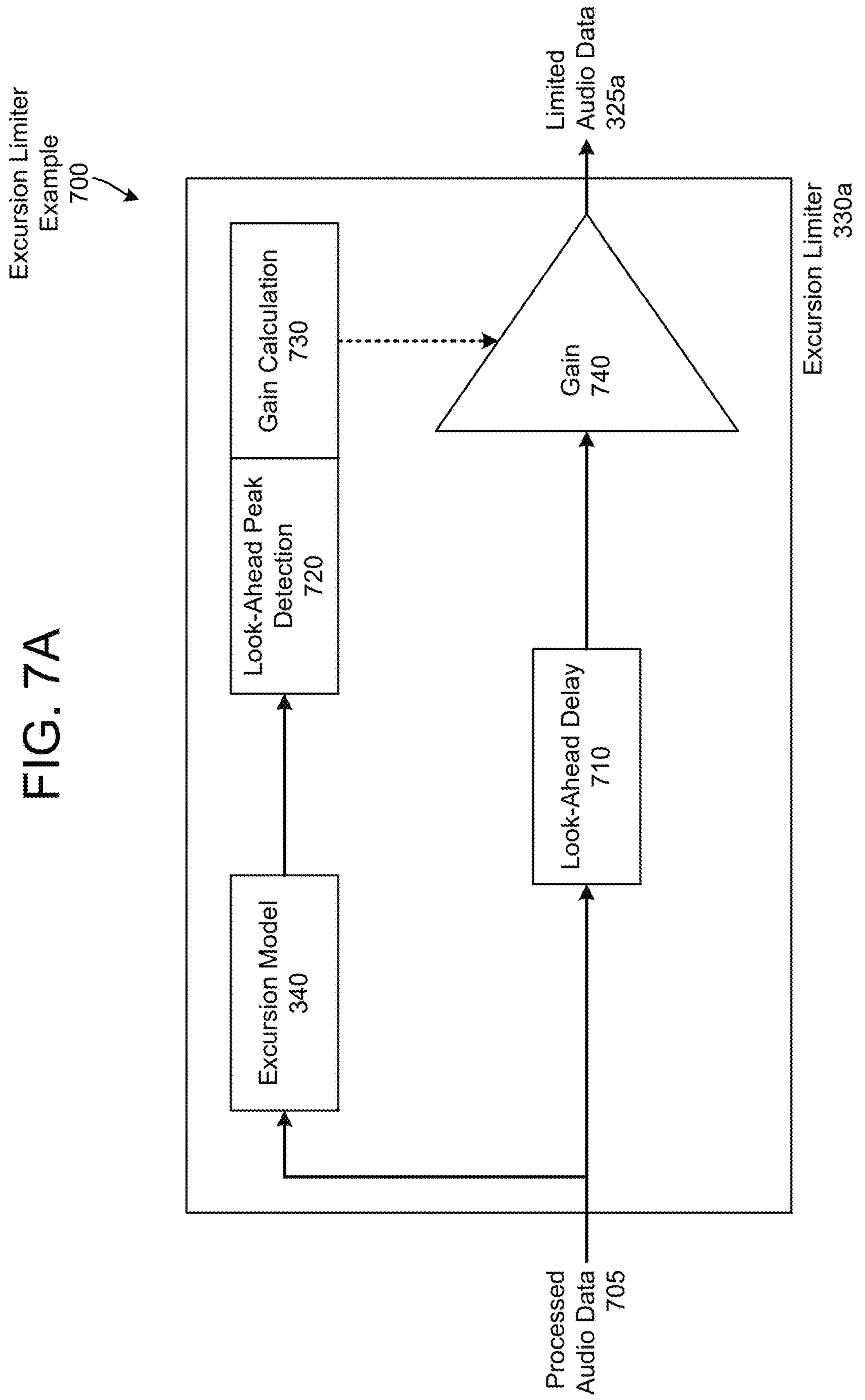
FIGS. 7A-7B illustrate examples of an excursion limiter and a joint voltage-excursion limiter according to embodiments of the present disclosure.
Figure 7B:
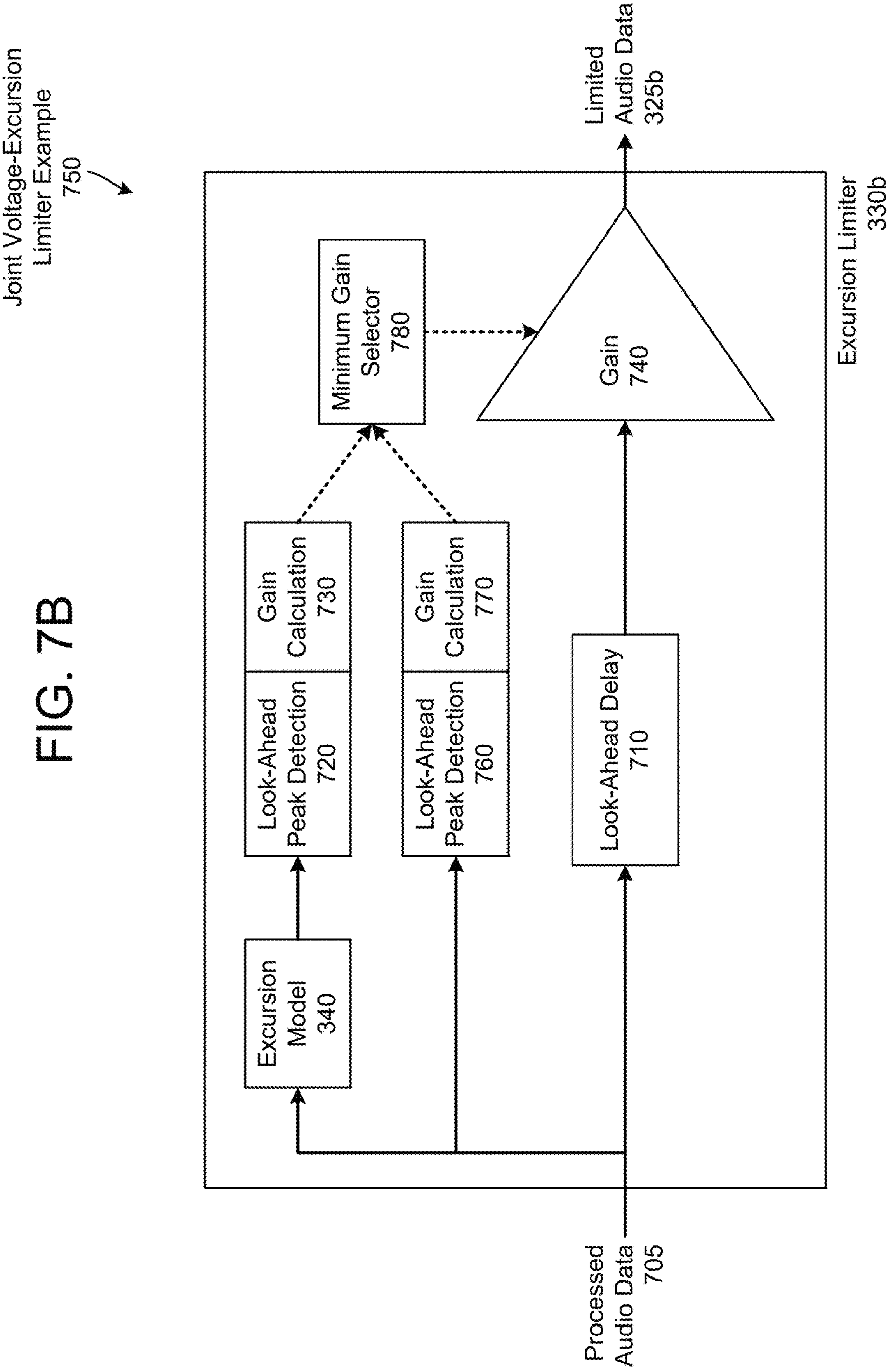

FIGS. 7A-7B illustrate examples of an excursion limiter and a joint voltage-excursion limiter according to embodiments of the present disclosure. In some examples, the excursion limiter component 330 may be configured to perform excursion limiting to limit the excursion associated with the driver 140. Thus, FIG. 7A illustrates an excursion limiter example 700 that includes a first excursion limiter component 330*a* directed exclusively to preventing the excursion from exceeding an excursion threshold. For example, the first excursion limiter component 330*a* may include the excursion model 340 described above, which is configured to predict a physical excursion for a current frame of processed audio data 705, and the first excursion limiter component 330*a* may calculate a gain value (e.g., amount of voltage attenuation) needed to keep the excursion under the excursion threshold.

The disclosure is not limited thereto, however, and in other examples the excursion limiter component 330 may be configured to perform voltage limiting concurrently with excursion limiting in order to prevent clipping. For example, limiting the excursion alone does not guarantee that the voltage signal will not exceed a full digital scale (e.g., clipping is still possible even while limiting the excursion). Thus, FIG. 7B illustrates a joint voltage-excursion limiter example 750 that includes a second excursion limiter component 330*b* that combines two parallel control paths, calculates two respective gain values, and picks a minimum of the two gain values as an output gain value to apply for the current frame.

Referring back to FIG. 7A, the first excursion limiter component 330*a* may receive the processed audio data 705 and calculate the gain value using the excursion model 340, a look-ahead peak detection component 720, and/or a gain calculation component 730. As described above, the excursion model 340 may be configured to predict an amount of excursion associated with the driver 140 based on the processed audio data 705. For example, the excursion model 340 may be configured to predict an amount of excursion using an input amplitude level (e.g., instantaneous voltage level) and frequency content of the processed audio data 705, although the disclosure is not limited thereto. The excursion model 340 may be calculated previously in a laboratory environment and is frequency-dependent. Thus, the excursion model 340 may enable the device 110 to convert between the amplitude level (e.g., instantaneous voltage level) of the processed audio data 705 for different frequency ranges and the amount of excursion without departing from the disclosure.

Using the excursion model, the look-ahead peak detection component 720 may be configured to identify peak amplitudes represented in the processed audio data 705 that would result in distortion due to the excursion. For example, the look-ahead peak detection component 720 may process the processed audio data 705 to identify peak amplitudes greater than a peak limit corresponding to an excursion threshold. Thus, the first excursion limiter component 330*a* may limit audio signals by a frequency-dependent excursion threshold, which effectively limits the driver excursion to a constant value in millimeters.

After the look-ahead peak detection component 720 identifies the peak amplitudes that would exceed the frequency-dependent excursion threshold, the gain calculation component 730 may be configured to determine gain value(s) with which the first excursion limiter component 330*a* may attenuate the identified peak amplitudes to prevent distortion due to the excursion. For example, the gain calculation component 730 may compare an identified peak amplitude value to a maximum potential amplitude value corresponding to the excursion threshold and estimate a corresponding gain value. Thus, the gain calculation component 730 may prevent the first limited audio data 325*a* from exceeding positive and negative maximum amplitude limits, which may drive the diaphragm associated with the driver 140 (e.g., the membrane of the loudspeaker 114) past a maximum excursion. For example, the gain calculation component 730 may suppress any portion of the processed audio data 705 that has a peak amplitude that is greater than an upper amplitude limit. The gain calculation component 730 may, for example, attenuate the processed audio data 705 such that any peak amplitudes of the processed audio data 705 remain within the maximum amplitude limits. Limiting said peak amplitudes may lessen or prevent damage to any circuitry or components of the device 110 and/or may reduce the total harmonic distortion of the output audio 145.

While the first excursion limiter component 330*a* calculates the gain value, a look-ahead delay component 710 may store the processed audio data 705 for time alignment. In some examples, the look-ahead delay component 710 may correspond to a delay element used to delay the processed audio data 705 to account for a delay associated with the excursion model 340, the look-ahead peak detection component 720, and/or the gain calculation component 730.

To generate first limited audio data 325*a*, a gain component 740 may apply the calculated gain value to one or more frames of the processed audio data 705 output by the look-ahead delay component 710. For example, the gain component 740 may multiply an output of the look-ahead delay component 710 and an output of the gain calculation component 730 in accordance with the below equation.

$$\mathrm{Out}(k,n,i)=g(k,n)\times In(k,(n-1)\times L-D+i) \quad [1]$$

where Out(k, n, i) denotes a current frame of the first limited audio data 325*a*, g(k, n) denotes the calculated gain value output by the gain calculation component 730, In(k, (n−1) denotes a current frame of the processed audio data 705 output by the look-ahead delay component 710, L is the frame length in samples, and i ranges from 0 to L−1. L may be, for example, 96 samples for 2 milliseconds of 48 kHz sampling rate.

As described above, the excursion limiter example 700 is only directed to performing excursion limiting and may not prevent clipping. For example, limiting the excursion alone does not guarantee that the voltage signal will not exceed a full digital scale (e.g., clipping is still possible even while limiting the excursion). Thus, FIG. 7B illustrates a joint voltage-excursion limiter example 750 that performs voltage limiting concurrently with excursion limiting. As illustrated in FIG. 7B, a second excursion limiter component 330*b* may combine two parallel control paths, calculate two respective gain values, and pick a minimum of the two gain values as an output gain value to apply for the current frame.

In addition to the components described above with regard to the first excursion limiter component 330*a*, the second excursion limiter component 330*b* may include a second look-ahead peak detection component 760 and a second gain calculation component 770 in parallel to the look-ahead delay component 720 and the gain calculation component 730. For example, the second look-ahead peak detection component 760 and the second gain calculation component 770 may be configured to identify voltage peaks that would exceed the excursion threshold and calculate gain values with which to attenuate these voltage peaks.

A minimum gain selector component 780 may select a lower value between a first gain value generated by the gain calculation component 730 and a second gain value generated by the second gain calculation component 770. For example, if the first gain value and the second gain value are represented as a range of values between 0 and 1, the minimum gain selector component 780 may select the lowest value (e.g., closest to 0). However, the disclosure is not limited thereto, and if the first gain value and the second gain value are represented in decibels (dB), the minimum gain selector component 780 may select the lowest negative value without departing from the disclosure. Thus, the gain component 740 may apply the minimum gain value to ensure that second limited audio data 325*b* does not cause distortion by exceeding the excursion threshold.

Figure 8:
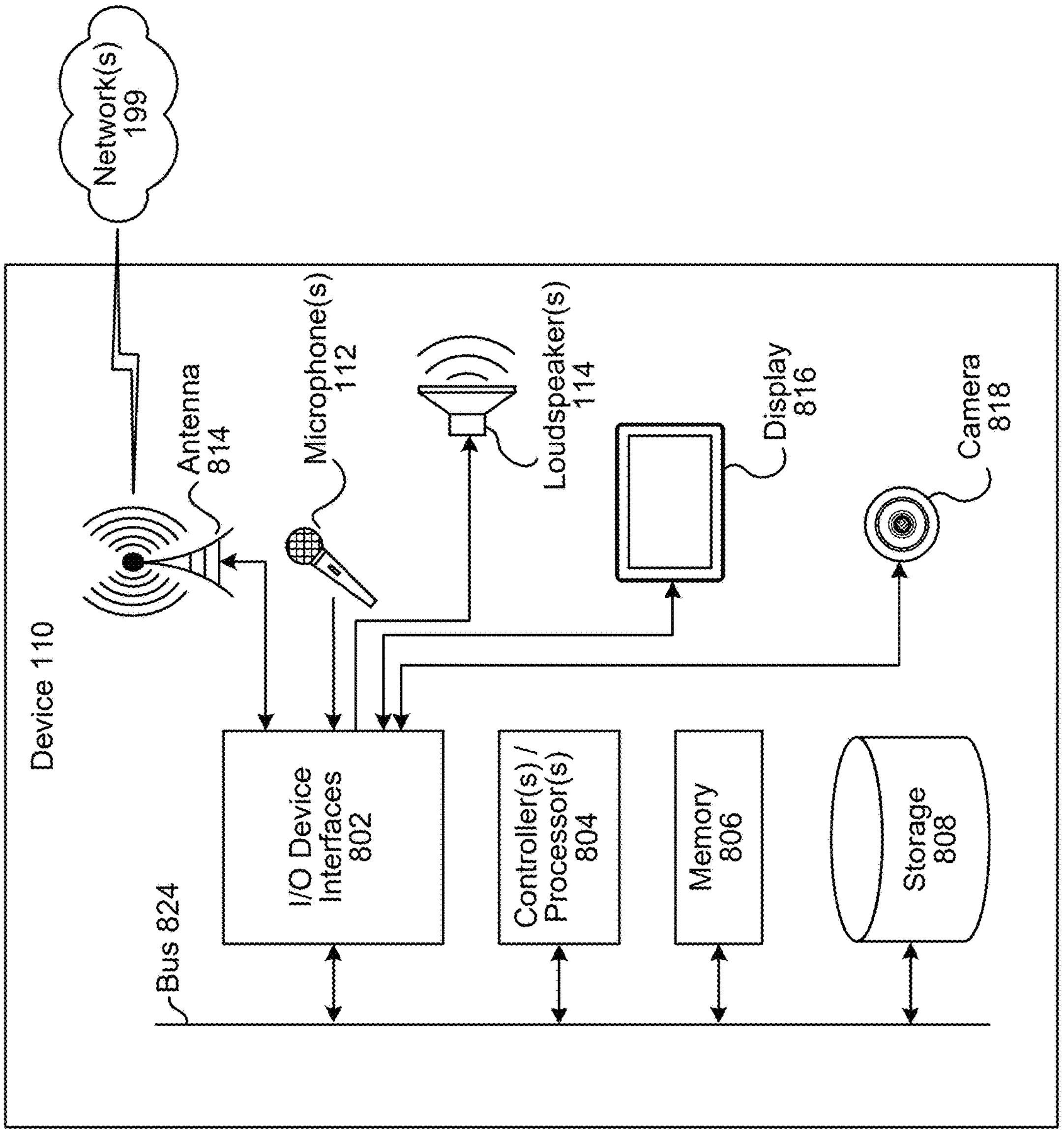
FIG. 8 is a block diagram conceptually illustrating example components of a system for managing temperature and excursion effects of a loudspeaker according to embodiments of the present disclosure.

FIG. 8 is a block diagram conceptually illustrating a device 110 that may be used with the system. In operation, the system 100 may include computer-readable and computer-executable instructions that reside on the device 110, as will be discussed further below.

The device 110 may include one or more audio capture device(s), such as microphone(s) 112 or an array of microphones. The audio capture device(s) may be integrated into the device 110 or may be separate. The device 110 may also include an audio output device for producing sound, such as loudspeaker(s) 114. The audio output device may be integrated into the device 110 or may be separate. In some examples the device 110 may include a display 816, but the disclosure is not limited thereto and the device 110 may not include a display or may be connected to an external device/display without departing from the disclosure.

The device 110 may include one or more controllers/processors (804), which may each include a central processing unit (CPU) for processing data and computer-readable instructions, and a memory (806) for storing data and instructions of the respective device. The memories (806) may individually include volatile random access memory (RAM), non-volatile read only memory (ROM), non-volatile magnetoresistive memory (MRAM), and/or other types of memory. The device 110 may also include a data storage component (808) for storing data and controller/processor-executable instructions. Each data storage component (808) may individually include one or more non-volatile storage types such as magnetic storage, optical storage, solid-state storage, etc. The device 110 may also be connected to removable or external non-volatile memory and/or storage (such as a removable memory card, memory key drive, networked storage, etc.) through respective input/output device interfaces (802).

Computer instructions for operating the device 110 and its various components may be executed by the respective device's controller(s)/processor(s) (804), using the memory (806) as temporary "working" storage at runtime. A device's computer instructions may be stored in a non-transitory manner in non-volatile memory (806), storage (808), or an external device(s). Alternatively, some or all of the executable instructions may be embedded in hardware or firmware on the respective device in addition to or instead of software.

The device 110 includes input/output device interfaces (802). A variety of components may be connected through the input/output device interfaces (802), such as the microphone(s) 112, the loudspeaker(s) 114, and/or the display 816. The input/output interfaces (802) may include A/D converters for converting the output of the microphone(s) 112 into microphone audio data, if the microphone(s) 112 are integrated with or hardwired directly to the device 110. If the microphone(s) 112 are independent, the A/D converters will be included with the microphone(s) 112, and may be clocked independent of the clocking of the device 110. Likewise, the input/output interfaces 1102 may include D/A converters for converting output audio data into an analog current to drive the loudspeaker(s) 114, if the loudspeaker(s) 114 are integrated with or hardwired to the device 110. However, if the loudspeaker(s) 114 are independent, the D/A converters will be included with the loudspeaker(s) 114 and may be clocked independent of the clocking of the device 110 (e.g., conventional Bluetooth loudspeakers).

Additionally, the device 110 may include an address/data bus (824) for conveying data among components of the respective device. Each component within a device 110 may also be directly connected to other components in addition to (or instead of) being connected to other components across the bus (824).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content and/or a camera 818 to capture image data, although the disclosure is not limited thereto. The input/output device interfaces (802) may also include an interface for an external peripheral device connection such as universal serial bus (USB), FireWire, Thunderbolt or other connection protocol.

The device 110 may connect to one or more network(s) 199 through either wired and/or wireless connections. For example, the device 110 may connect to the network(s) 199 via an Ethernet port, through a wireless service provider (e.g., using a WiFi or cellular network connection), over a wireless local area network (WLAN) (e.g., using WiFi or the like), over a wired connection such as a local area network (LAN), and/or the like. The network(s) 199 may include a local or private network or may include a wide network such as the Internet.

As illustrated in FIG. 8, the input/output device interfaces 802 may connect to the network(s) 199 via antenna(s) 814. For example, the device 110 may connect to the network(s) 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802) may also include communication components that allow data to be exchanged between devices such as different physical servers in a collection of servers or other components.

The components of the device(s) 110 may include their own dedicated processors, memory, and/or storage. Alternatively, one or more of the components of the device(s) 110 may utilize the I/O interfaces (802), processor(s) (804), memory (806), and/or storage (808) of the device(s) 110, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device(s) 110, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented in different forms of software, firmware, and/or hardware, such as an acoustic front end (AFE), which comprises, among other things, analog and/or digital filters (e.g., filters configured as firmware to a digital signal processor (DSP)). Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving, by an electronic device, first audio data representing a signal to be output by a loudspeaker of the electronic device;

determining first data representing a first amplitude of the first audio data;

determining, using the first data, a first model, and first weight values, second audio data, the first model trained using a driver response of the loudspeaker;

determining, using the second audio data and a second model, third audio data, the second model corresponding to simulation of output audio generated by the loudspeaker, wherein the third audio data represents the signal and distortion caused by the driver response of the loudspeaker;

determining fourth audio data using the first audio data and the third audio data, the fourth audio data representing the distortion; and determining second weight values associated with the first model by minimizing a first difference between the third audio data and the first audio data.

2. The computer-implemented method of claim 1, further comprising:

receiving, by the electronic device, fifth audio data;

determining, using the fifth audio data, the first model, and the second weight values, sixth audio data; and generating, by the loudspeaker, first output audio using the sixth audio data.

3. The computer-implemented method of claim 1, further comprising:

generating, by the loudspeaker, first output audio using the second audio data;

determining second data representing a second amplitude of the first audio data;

determining, using the second data, the first model, and the second weight values, fifth audio data; and generating, by the loudspeaker, second output audio using the fifth audio data.

4. The computer-implemented method of claim 1, wherein the first weight values and the second audio data correspond to a first range of frequencies, the computer-implemented method further comprising:

determining second data representing a second amplitude of the first audio data;

determining, using the second data, the first model, and third weight values that are different than the first weight values, fifth audio data, wherein the third weight values and the fifth audio data correspond to a second range of frequencies;

determining, using the fifth audio data and the second model, sixth audio data; and determining, using the first audio data and the sixth audio data, fourth weight values associated with the first model, the fourth weight values corresponding to the second range of frequencies.

5. The computer-implemented method of claim 1, wherein determining the third audio data further comprises:

determining a first portion of the second audio data, the first portion of the second audio data corresponding to a first range of frequencies;

determining a first portion of the third audio data using the second model, third weight values, and the first portion of the second audio data, wherein the third weight values correspond to a first portion of the driver response that is associated with the first range of frequencies;

determining a second portion of the second audio data, the second portion of the second audio data corresponding to a second range of frequencies; and determining a second portion of the third audio data using the second model, fourth weight values, and the second portion of the second audio data, wherein the fourth weight values correspond to a second portion of the driver response that is associated with the second range of frequencies.

6. The computer-implemented method of claim 1, further comprising:

determining first loudness data representing first sound pressure levels of the first audio data;

determining second loudness data representing second sound pressure levels of the third audio data;

determining a first function corresponding to minimizing a second difference between the second loudness data and the first loudness data;

determining a second function corresponding to maximizing the second sound pressure levels; and determining a cost function using the first function and the second function, wherein the cost function includes a first association between the first function and a first value and a second association between the second function and a second value and the second weight values are determined using the cost function.

7. The computer-implemented method of claim 1, wherein determining the second audio data further comprises:

determining, using the first data, second data corresponding to temperature of the loudspeaker;

generating, using first parameter values, first gain data by reducing a second amplitude of the second data;

generating fifth audio data using the first audio data and the first gain data; and determining the second audio data using the first model, the fifth audio data, and the first weight values, wherein the computer-implemented method further comprises:

determining, using the fourth audio data, second parameter values.

8. The computer-implemented method of claim 7, further comprising:

receiving, by the electronic device, sixth audio data;

determining, using the sixth audio data, third data corresponding to the temperature of the loudspeaker;

generating, using the second parameter values, second gain data by reducing a third amplitude of the third data;

generating seventh audio data using the sixth audio data and the second gain data;

determining eighth audio data using the first model, the seventh audio data, and the second weight values; and generating, by the loudspeaker, first output audio using the eighth audio data.

9. The computer-implemented method of claim 1, wherein determining the second audio data further comprises:

determining, using the first data, second data corresponding to excursion of a membrane of the loudspeaker;

generating, using first parameter values, first gain data by reducing a second amplitude of the second data;

generating fifth audio data using the first audio data and the first gain data; and determining the second audio data using the first model, the fifth audio data, and the first weight values, wherein the computer-implemented method further comprises:

determining, using the fourth audio data, second parameter values.

10. The computer-implemented method of claim 9, further comprising:

receiving, by the electronic device, sixth audio data;

determining, using the sixth audio data, third data corresponding to the excursion of the membrane;

generating, using the second parameter values, second gain data by reducing a third amplitude of the third data;

generating seventh audio data using the sixth audio data and the second gain data;

determining eighth audio data using the first model, the seventh audio data, and the second weight values; and generating, by the loudspeaker, first output audio using the eighth audio data.

11. A system comprising:

at least one processor; and memory including instructions operable to be executed by the at least one processor to cause the system to:

receive, by an electronic device, first audio data representing a signal to be output by a loudspeaker of the electronic device;

determine, based on a first amplitude of the first audio data, first data corresponding to temperature of the loudspeaker;

generate, using a first component and first parameter values, first gain data by reducing a second amplitude of the first data;

generate second audio data using the first audio data and the first gain data;

determine, based on a third amplitude of the second audio data, second data corresponding to excursion of a membrane of the loudspeaker;

generate, using a second component and second parameter values, second gain data by reducing a fourth amplitude of the second data;

generate third audio data using the second audio data and the second gain data;

determine, using a first model and the third audio data, fourth audio data, the first model corresponding to simulation of output audio generated by the loudspeaker, wherein the fourth audio data represents the signal and distortion caused by a driver response of the loudspeaker;

determine fifth audio data using the first audio data and the fourth audio data, the fifth audio data representing the distortion; and determine, using the fifth audio data, third parameter values associated with the first component by minimizing a first difference between the fourth audio data and the first audio data.

12. The system of claim 11, wherein the memory further comprises instructions that, when executed by the at least one processor, further cause the system to:

determine, using the fifth audio data, fourth parameter values associated with the second component;

receive, by the electronic device, sixth audio data;

determine seventh audio data using the first component, the sixth audio data, and the third parameter values;

determine eighth audio data using the second component, the seventh audio data, and the fourth parameter values; and generate, by the loudspeaker, first output audio using the eighth audio data.

13. The system of claim 11, wherein the memory further comprises instructions that, when executed by the at least one processor, further cause the system to:

determine, using the fifth audio data, fourth parameter values associated with the second component;

generate, by the loudspeaker, first output audio using the third audio data, the first output audio corresponding to a first portion of the first audio data;

determine sixth audio data using the first component, a second portion of the first audio data, and the third parameter values;

determine seventh audio data using the second component, the sixth audio data, and the fourth parameter values; and generate, by the loudspeaker, second output audio using the seventh audio data.

14. The system of claim 11, wherein the memory further comprises instructions that, when executed by the at least one processor, further cause the system to:

determine a first portion of the third audio data, the first portion of the third audio data corresponding to a first range of frequencies;

determine, using the first model, first values, and the first portion of the third audio data, a first portion of the fourth audio data, wherein the first values correspond to a first portion of a driver response of the loudspeaker;

determine a second portion of the third audio data, the second portion of the third audio data corresponding to a second range of frequencies; and determine, using the first model, second values, and the second portion of the third audio data, a second portion of the fourth audio data, wherein the second values correspond to a second portion of the driver response.

15. The system of claim 11, wherein the memory further comprises instructions that, when executed by the at least one processor, further cause the system to:

determine first loudness data representing first sound pressure levels of the first audio data;

determine second loudness data representing second sound pressure levels of the fourth audio data;

determine a first function corresponding to minimizing a second difference between the second loudness data and the first loudness data;

determine a second function corresponding to maximizing the second sound pressure levels; and determine a cost function using the first function and the second function, wherein the cost function includes a first association between the first function and a first value and a second association between the second function and a second value and the third parameter values are determined using the cost function.

16. The system of claim 11, wherein the memory further comprises instructions that, when executed by the at least one processor, further cause the system to:

generate sixth audio data using the second audio data and the second gain data;

determine, using a second model, the sixth audio data, and first values, the third audio data, the second model trained using a driver response of the loudspeaker; and determine, using the fifth audio data, second values associated with the second model.

17. The system of claim 16, wherein the memory further comprises instructions that, when executed by the at least one processor, further cause the system to:

determine, using the fifth audio data, fourth parameter values associated with the second component;

receive, by the electronic device, sixth audio data;

determine seventh audio data using the first component, the sixth audio data, and the third parameter values;

determine eighth audio data using the second component, the seventh audio data, and the fourth parameter values;

determine ninth audio data using the second model, the eighth audio data, and the second values; and generate, by the loudspeaker, first output audio using the ninth audio data.

18. The system of claim 11, wherein the memory further comprises instructions that, when executed by the at least one processor, further cause the system to:

determine, using the first amplitude of the first audio data, a first average voltage level associated with a portion of the first audio data;

determine, using a thermal model associated with the first component, a first temperature value of the loudspeaker corresponding to the first average voltage level, the first data including the first temperature value;

determine, using the third amplitude of the second audio data, a second voltage level associated with a portion of the second audio data; and determine, using an excursion model associated with the second component, a first excursion value of the membrane corresponding to the second voltage level, the second data including the first excursion value.

19. A computer-implemented method comprising:

receiving, by an electronic device, first audio data;

determining first data representing a first amplitude of the first audio data;

determining, using the first data, a first model, and first weight values, second audio data, the first model trained using a driver response of a loudspeaker of the electronic device;

determining, using the second audio data and a second model, third audio data, the second model corresponding to simulation of output audio generated by the loudspeaker;

determining fourth audio data using the first audio data and the third audio data;

determining, using the fourth audio data, second weight values associated with the first model;

receiving, by the electronic device, fifth audio data;

determining, using the fifth audio data, the first model, and the second weight values, sixth audio data; and generating, by the loudspeaker, first output audio using the sixth audio data.

* * * * *